(12) United States Patent
Endo et al.

(10) Patent No.: US 8,736,957 B2
(45) Date of Patent: May 27, 2014

(54) TRANSMITTED LIGHT SELECTING DEVICE, THREE-DIMENSIONAL IMAGE DISPLAY DEVICE, AND THREE-DIMENSIONAL IMAGE DISPLAY METHOD

(75) Inventors: Takao Endo, Tokyo (JP); Yuzo Nakano, Tokyo (JP); Takayuki Yanagisawa, Tokyo (JP); Yoshihito Hirano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 233 days.

(21) Appl. No.: 13/205,047

(22) Filed: Aug. 8, 2011

(65) Prior Publication Data
US 2012/0212814 A1 Aug. 23, 2012

(30) Foreign Application Priority Data
Feb. 18, 2011 (JP) ................................. 2011-033329

(51) Int. Cl.
*G02B 27/26* (2006.01)
*G02B 27/22* (2006.01)
*H04N 13/04* (2006.01)

(52) U.S. Cl.
USPC ................ 359/465; 359/464; 348/57; 348/58

(58) Field of Classification Search
USPC ............ 359/465, 462, 464; 351/240, 232, 49; 348/57, 58; 349/15, 96
See application file for complete search history.

(56) References Cited

U.S. PATENT DOCUMENTS 7,705,935 B2 * 4/2010 Gaudreau ...................... 349/96

FOREIGN PATENT DOCUMENTS

| JP | 2004-157425 | 6/2004 |
|---|---|---|
| JP | 4304962 | 5/2009 |

* cited by examiner

*Primary Examiner* — Audrey Y Chang
(74) *Attorney, Agent, or Firm* — Oblon, Spivak, McClelland, Maier & Neustadt, L.L.P.

(57) ABSTRACT

A transmitted light selecting device includes a first light selecting unit having a polarizing filter for allowing an image light ray having one polarization direction to pass therethrough; a phase difference film for providing phase differences to the light ray passing through the polarizing filter to emit light, in which light rays having polarization directions coexist, toward a viewer; a second light selecting unit having a polarizing filter having a polarized light transmission axis perpendicular to that of the polarizing filter; and a phase difference film for providing phase differences to a light ray passing through the polarizing filter to emit light, in which light rays having polarization directions coexist, toward the viewer.

6 Claims, 14 Drawing Sheets

TRANSMITTED LIGHT SELECTING DEVICE, THREE-DIMENSIONAL IMAGE DISPLAY DEVICE, AND THREE-DIMENSIONAL IMAGE DISPLAY METHOD

BACKGROUND OF THE INVENTION

1. Field of the Invention

The present invention relates to a transmitted light selecting device that displays a right-eye image and a left-eye image on an image display device, selectively allows image light ray of the right-eye image to pass therethrough toward a viewer's right eye, and selectively allows image light ray of the left-eye image to pass therethrough toward the viewer's left eye, and a three-dimensional image display device and a three-dimensional image display method using this transmitted light selecting device.

2. Description of Related Art

For example, patent reference 1 discloses a three-dimensional image display device which enables a viewer to observe character information, as well as three-dimensional image information, certainly and clearly. Because this device has a circularly polarizing unit, such as a quarter-wave plate, for converting light into circularly polarized light within a region narrower than that of a divided wave plate filter, an image divided into a right-eye image and a left-eye image is incident upon the viewer's right eye or left eye certainly within a region of the circularly polarizing unit and therefore a clear three-dimensional image can be acquired. In contrast, because the circularly polarizing unit does not function within a region of the divided wave plate filter other than that of the circularly polarizing unit, character information is not separated and is sufficiently incident upon both of the viewer's right and left eyes. Therefore, within this region, the viewer can observe the character information clearly.

RELATED ART DOCUMENT

Patent Reference

Patent reference 1: JP, 2004-157425, A

According to conventional technologies including the invention described in patent reference 1, because each of the right-eye image and the left-eye image is selected according to its polarization direction, only one polarized light reaches each eye certainly.

Polarized light is divided into two types of light rays whose polarization directions are perpendicular to each other, such as P-polarized light and S-polarized light in the case of linearly polarized light, or right circularly polarized light and left circularly polarized light in the case of circularly polarized light. Furthermore, although light also causes an interference phenomenon because of having a property of serving as an electromagnetic wave, light rays of the same type easily have interference by which the light waves strengthen or weaken each other. As an indicator showing how easily interference occurs, there is a degree of coherence.

As mentioned above, according to a conventional technology, because each of a right-eye image and a left-eye image is selected according to its polarization direction, although two types of light rays which are perpendicular to each other are provided, each eye of a viewer selectively receives only one of the two types of light rays certainly. A problem is therefore that interference of the light wave occurs and a large flicker appears in the image due to speckle or scintillation.

Such a flicker of the image becomes remarkable in the case in which a laser or an LED (Light Emitting Diode) having a high degree of coherence is used as the light source of the image display device, or in the case in which the image display device is a projector having a large projection magnification, a projection TV, or the like.

SUMMARY OF THE INVENTION

The present invention is made in order to solve the above-mentioned problem, and it is therefore an object of the present invention to provide a transmitted light selecting device, a three-dimensional image display device and a three-dimensional image display method which can reduce image degradation resulting from the degree of coherence of light, such as speckle.

In accordance with the present invention, there is provided a transmitted light selecting device that selectively allows image light rays of images which are displayed in polarization directions perpendicular to each other on an image display device according to the polarization directions to pass therethrough, the transmitted light selecting device including: a first light selecting unit for generating light in which light rays having a plurality of polarization directions coexist from an image light ray having one of the polarization directions incident thereupon from the image display device to emit the light toward a viewer; and a second light selecting unit for generating light in which light rays having a plurality of polarization directions coexist from an image light ray having one of the polarization directions incident thereupon from the image display device to emit the light toward the viewer. Preferably, the first light selecting unit has a first polarizing filter for allowing the image light ray incident upon the first light selecting unit to pass therethrough, and a first phase difference film for providing phase differences to the light ray passing through the first polarizing filter to emit light in which light rays having a plurality of polarization directions coexist toward the viewer, and the second light selecting unit has a second polarizing filter having a polarized light transmission axis whose direction is perpendicular to that of the first polarizing filter, for allowing the image light ray incident upon the second light selecting unit to pass therethrough, and a second phase difference film for providing phase differences to the light ray passing through the second polarizing filter to emit light in which light rays having a plurality of polarization directions coexist toward the viewer, and the polarizing filters are arranged on a side of the image display device and the phase difference films are arranged on a side of the viewer.

In accordance with the present invention, there is provided an advantage of being able to reduce the image degradation resulting from the degree of coherence of light, such as speckle.

Further objects and advantages of the present invention will be apparent from the following description of the preferred embodiments of the invention as illustrated in the accompanying drawings.

EMBODIMENTS OF THE INVENTION

Embodiment 1

Figure 1:
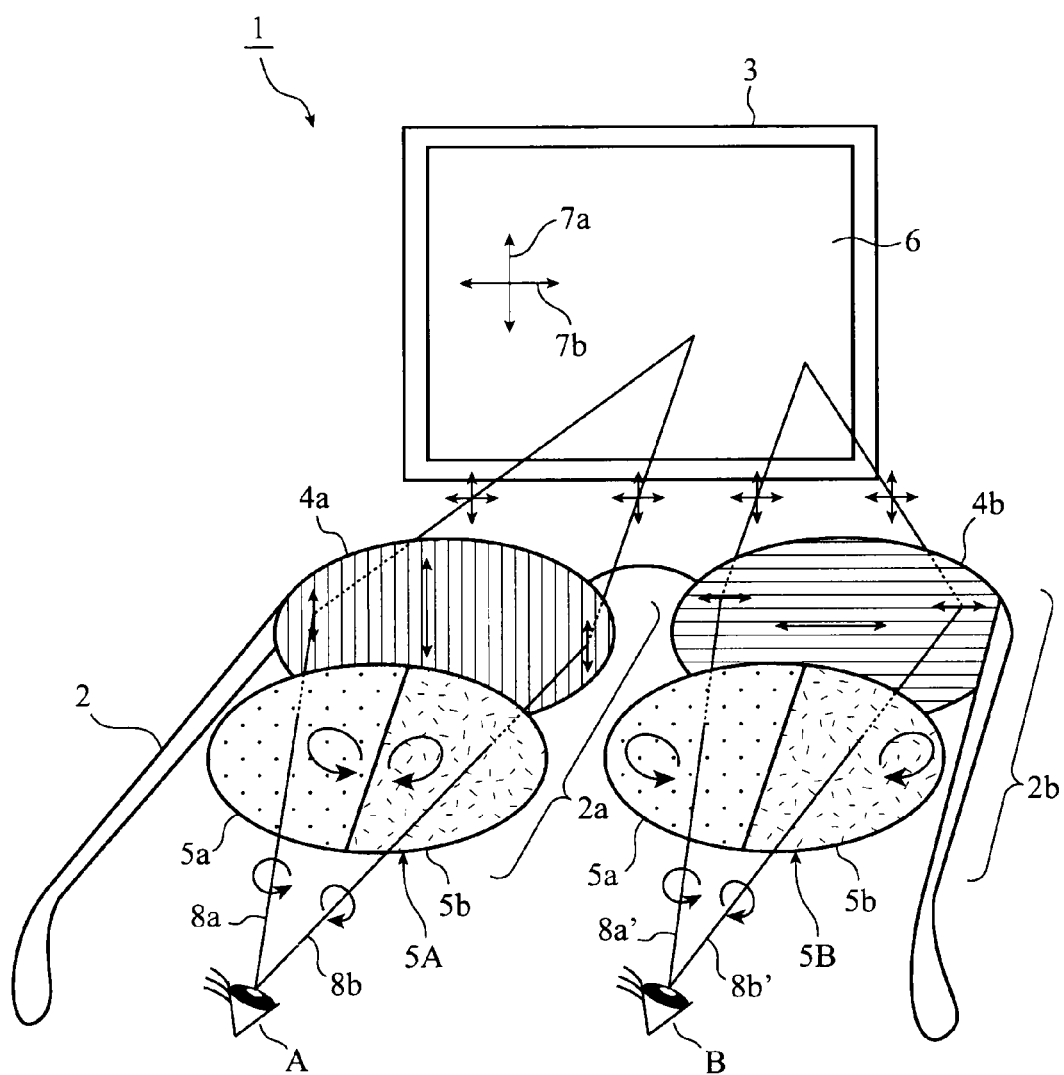
FIG. 1 is a view showing the structure of a three-dimensional image display device in accordance with Embodiment 1 of the present invention.

FIG. 1 is a view showing the structure of a three-dimensional image display device in accordance with Embodiment 1 of the present invention. In FIG. 1, the three-dimensional image display device 1 in accordance with Embodiment 1 enables a viewer to view an image on a screen 6 of an image display device 3 via a transmitted light selecting device 2 to make the viewer view the image displayed in three dimensions. The transmitted light selecting device 2 selectively allows an image light ray 7a of a left-eye image and an image light ray 7b of a right-eye image, which are displayed on the screen 6 of the image display device 3, to pass therethrough toward the viewer's left eye A and right eye B, respectively. For example, the transmitted light selecting device 2 is formed in the form of glasses which the viewer can wear. The image display device 3 displays the image light ray 7a having a polarization direction corresponding to the left-eye image and the image light ray 7b having a polarization direction perpendicular to that of the image light ray 7a and corresponding to the right-eye image on the screen 6.

Furthermore, the transmitted light selecting device 2 is provided with a first light selecting unit 2a and a second light selecting unit 2b which correspond to the viewer's left eye A and right eye B, respectively. The first light selecting unit 2a includes a polarizing filter 4a and a phase difference film 5A, and the second light selecting unit 2b includes a polarizing filter 4b and a phase difference film 5B. The polarizing filter 4a has a function of selectively allowing the image light ray 7a for the viewer's left eye, among the image light rays 7a and 7b displayed on the screen 6 of the image display device 3, to pass through according to its polarization direction, and the polarizing filter 4b has a function of selectively allowing the image light ray 7b for the viewer's right eye to pass through according to its polarization direction. More specifically, the image light ray 7a which is allowed to pass through the polarizing filter 4a cannot pass through the polarizing filter 4b while the image light ray 7b which is allowed to pass through the polarizing filter 4b cannot pass through the polarizing filter 4a. The polarization directions of the polarizing filters 4a and 4b have a relation of being perpendicular to each other.

Each of the phase difference films 5A and 5B provides a phase difference to light incident thereupon when this light passes therethrough. For example, a quarter-wave plate or the like is used as each of the phase difference films. Furthermore, in the example of FIG. 1, a case in which each of the phase difference films 5A and 5B is formed of two types of phase difference films which are a first phase difference film portion 5a and a second phase difference film portion 5b is shown. The first phase difference film portion 5a and the second phase difference film portion 5b have polarized light transmission axes whose directions differ from each other. The polarization direction of transmitted light to which a phase difference is provided by the first phase difference film portion 5a differs from that of transmitted light to which a phase difference is provided by the second phase difference film portion 5b. Hereinafter, a case in which the first and second phase difference film portions 5a and 5b are arranged in such a way that the directions of the polarized light transmission axes of the first and second phase difference film portions are perpendicular to each other will be explained.

Furthermore, in each of the first and second light selecting units 2a and 2b, the first and second phase difference film portions 5a and 5b are arranged in right and left regions having substantially the same area into which each of the phase difference films 5A and 5B is divided, respectively. In the case in which the first and second phase difference film portions 5a and 5b are arranged in this way, a light ray to which the phase difference is provided by each of the first and second phase difference film portions 5a and 5b has a nearly equal amount of light. More specifically, the polarized light ray which is allowed to pass through each of the polarizing filters 4a and 4b can be divided into two light rays 8a and 8b (8a' and 8b') having different polarization directions to which the phase differences are provided by the first and second phase difference film portions 5a and 5b.

Figure 2:
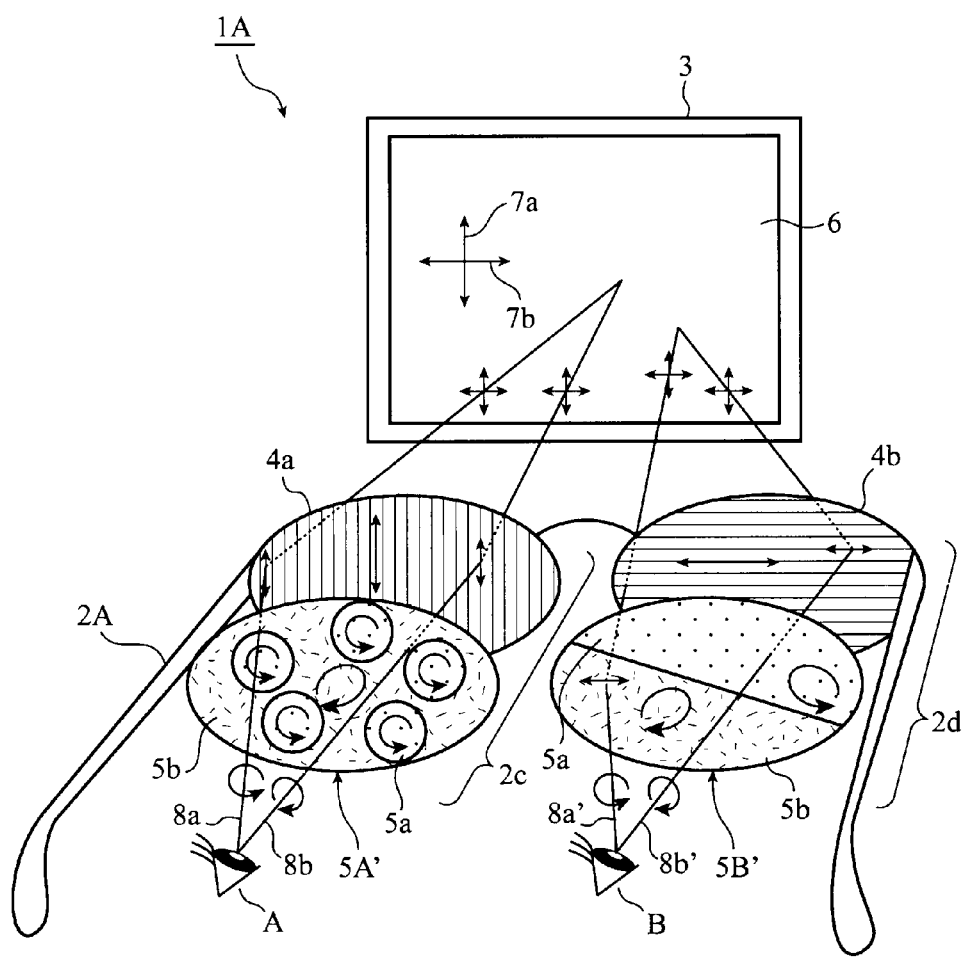
FIG. 2 is a view showing another example of the structure of the three-dimensional image display device in accordance with Embodiment 1.

FIG. 2 is a view showing another example of the structure of the three-dimensional image display device in accordance with Embodiment 1. In this figure, the same components as those shown in FIG. 1 are designated by the same reference numerals. The three-dimensional image display device 1A enables a viewer to view an image on the screen 6 of the image display device 3 via a transmitted light selecting device 2A to make the viewer view the image displayed in three dimensions. The transmitted light selecting device 2A selectively allows the image light ray 7a of the left-eye image and the image light ray 7b of the right-eye image, which are displayed on the screen 6 of the image display device 3, to pass therethrough toward the viewer's left eye A and right eye B, respectively. The transmitted light selecting device 2A is provided with a first light selecting unit 2c and a second light selecting unit 2d. The first light selecting unit 2c includes a polarizing filter 4a and a phase difference film 5A', and the second light selecting unit 2c includes a polarizing filter 4b and a phase difference film 5B'.

In the phase difference film 5A' of the first light selecting unit 2c, a plurality of first phase difference film portions 5a are arranged in a plurality of subregions on a film plane in which a second phase difference film portion 5b is disposed as a base, respectively. The sum total of the areas of the subregions corresponding to the first phase difference film portions 5a is substantially the same as the area of the remaining region on the film plane which corresponds to the second phase difference film portion 5b. In the phase difference film 5B' of the second light selecting unit 2d, first and second phase difference film portions 5a and 5b are arranged in upper and lower regions having substantially the same area into which the film plane is divided, respectively. The first and second phase difference film portions 5a and 5b can be formed in various shapes and arranged in various forms in this way. In FIGS. 1 and 2, although the case in which each of the transmitted light selecting devices 2 and 2A is constructed in the form of glasses which the viewer can wear, the present embodiment is not limited to these examples. For example, a plate-shaped member in which the first light selecting unit 2c and the second light selecting unit 2d are disposed can be used, or a member shaped like a telescope can be used.

Furthermore, in the first light selecting unit 2a and in the second light selecting unit 2b, the polarizing filters 4a and 4b are arranged on a side of the screen 6 of the image display device 3, respectively, and the phase difference films 5A and 5A' are arranged on a side of the viewer, respectively. Similarly, in the first light selecting unit 2c and in the second light selecting unit 2d, the polarizing filters 4a and 4b are arranged on a side of the screen 6 of the image display device 3, respectively, and the phase difference films 5B and 5B' are arranged on a side of the viewer, respectively. In FIGS. 1 and 2, for the sake of simplicity, although the polarizing filter and the phase difference film in each of the first and second light selecting units are shown in such a way as to be spatially apart from each other, they can be arranged in such a way as to be in spatial contact with each other.

The polarizing filter and the phase difference film can be bonded to each other with an adhesive or the like, or an optical film of the phase difference film can be formed on the polarizing filter with coating or the like. Particularly, in case in which an air layer exists between the polarizing filter and the phase difference film, because their refractive indices differ greatly from that of the air, a loss due to Fresnel reflection of light occurs in each interface. Therefore, by forming the polarizing filter and the phase difference film into a single piece, the loss due to Fresnel reflection can be reduced.

Next, the details of an image display created by the three-dimensional image display device in accordance with Embodiment 1 will be explained. Hereinafter, the structure of the transmitted light selecting device in accordance with Embodiment 1 will be explained with reference to FIG. 1. Also in the case in which the transmitted light selecting device has the structure of FIG. 2, an image display is created on the same principle. In the first light selecting unit 2a, the polarizing filter 4a selectively allows the image light ray 7a of the left-eye image displayed on the image display device 3 to pass therethrough. On the other hand, the image light ray 7b of the right-eye image having a polarization direction perpendicular to that of the image light ray 7a is selectively allowed to pass through by the polarizing filter 4b of the second light selecting unit 2b.

The image light ray 7a which is allowed to pass through the polarizing filter 4a is given a phase difference by the phase difference film 5A, so that the polarization direction of the image light ray is changed. Similarly, the image light ray 7b which is allowed to pass through the polarizing filter 4b is given a phase difference by the phase difference film 5B, so that the polarization direction of the image light ray is changed. In this embodiment, for the sake of simplicity, it is assumed that the first and second phase difference film portions 5a and 5b are quarter-wave plates, and, in each of the phase difference films 5A and 5B, the first and second phase difference film portions 5a and 5b are arranged in such a way that the directions of their polarized light transmission axes are perpendicular to each other. When linearly-polarized light passes through a quarter-wave plate, a phase difference is provided to the electric field vector of the electromagnetic wave and the linearly-polarized light changes to circularly-polarized light.

In the phase difference film 5A, the first phase difference film portion 5a receives the image light ray 7a (having P polarization, for example) of the left-eye image incident thereupon to make a first left-eye image light ray 8a which is circularly polarized light (e.g., left circularly polarized light) pass therethrough. On the other hand, the second phase difference film portion 5b receives the image light ray 7a (having P polarization, for example) of the left-eye image incident thereupon to make a second left-eye image light ray 8b which is circularly polarized light (e.g., right circularly polarized light) pass therethrough. More specifically, the first left-eye image light ray 8a and the second left-eye image light ray 8b have a relation of their polarization directions being perpendicular to each other. Similarly, also in the phase difference film 5B, the first phase difference film portion 5a receives the image light ray 7b (having S polarization, for example) of the right-eye image incident thereupon to make a first right-eye image light ray 8a' which is circularly polarized light (e.g., left circularly polarized light) pass therethrough. On the other hand, the second phase difference film portion 5b receives the image light ray 7b (having S polarization, for example) of the right-eye image incident thereupon to make a second right-eye image light ray 8b' which is circularly polarized light (e.g., right circularly polarized light) pass therethrough. Therefore, the first right-eye image light ray 8a' and the second right-eye image light ray 8b' have a relation of their polarization directions being perpendicular to each other.

In the viewer's left eye A, light which is the addition of the first left-eye image light ray 8a and the second left-eye image light ray 8b passing through the phase difference film 5A is observed. On the other hand, in the viewer's right eye B, light which is the addition of the first right-eye image light ray 8a' and the second right-eye image light ray 8b' passing through the phase difference film 5B is observed. Although a polarization eyeglass which is a conventional transmitted light selecting device has a polarizing filter 4a for left eye and a polarizing filter 4b for right eye in accordance with the present invention, the polarization eyeglass does not have such phase difference films 5A and 5B as mentioned above. Therefore, the viewer's left eye observes only the image light ray 7a of linear polarization (e.g., P polarization) which is allowed to pass through the polarizing filter 4a while the viewer's right eye observes only the image light ray 7b of linear polarization (e.g., S polarization) which is allowed to pass through the polarizing filter 4b.

It is said that the degree of coherence of a light wave is in a high state when modes each defined by an initial phase, a frequency (an energy spectrum), or a wave vector (showing the direction of the light) match each other. In contrast, when the parameters defining a mode are not uniform, the degree of coherence is low. More specifically, light rays in phase, light rays having a single frequency and light rays aligned in one direction have a high degree of coherence. More concretely, because laser light has a single initial phase, a narrow frequency width (a single frequency), and a low divergence (aligned in one direction), the laser light has a high degree of coherence. In contrast, because white light has different initial phases, a wide frequency width, and a large divergence, the white light has a low degree of coherence (incoherent light).

Furthermore, light is a photon quantum-mechanically. A photon spin has the following two states: +1 and −1, and these states correspond to right circularly polarized light and left circularly polarized light, respectively. The degree of coherence of polarized light having a single direction is low when the polarized light includes light having a different polarization direction, whereas the degree of coherence of the polarized light is high when the polarized light has a single polarization direction. Put another way using energy, the degree of coherence is high when electrons fall to the ground state to be degenerate, whereas the degree of coherence is low when the degeneration is released. Therefore, in order to reduce the degree of coherence, what is necessary is to convert a single polarization direction into various directions and to mix these directions.

To this end, in accordance with this Embodiment 1, in each of the phase difference films 5A and 5B, the transmitted light is made to have a single polarization direction when passing through the region in which the first phase difference film portion 5a is disposed while the transmitted light is made to have a single polarization direction perpendicular to the above-mentioned polarization direction when passing through the region in which the second phase difference film portion 5b is disposed, thereby being able to reduce the degree of coherence of the image light ray which the viewer observes. For example, by converting each linearly polarized light ray into a circularly polarized light ray, or by rotating the polarization direction of each linearly polarized light ray, and, after that, mixing the light rays having different spatial states to add them, the degree of coherence of the image light ray can be reduced.

More specifically, in the example of FIG. 1, the polarization state of the first left-eye image light ray 8a which is allowed to pass through the first phase difference film portion 5a of the phase difference film 5A, and that of the second left-eye image light ray 8b which is allowed to pass through the second phase difference film 5b are mixed spatially while the first and second left-eye image light rays propagate from the pupil of the viewer's left eye A to the retina. As a result, the first and second left-eye image light rays have polarizations perpendicular to each other, and the degree of coherence of the left-eye image light rays is reduced. Similarly, the polarization state of the first right-eye image light ray 8a' which is allowed to pass through the first phase difference film portion 5a of the phase difference film 5B, and that of the second right-eye image light ray 8b' which is allowed to pass through the second phase difference film 5b are mixed spatially while the first and second right-eye image light rays propagate from the pupil of the viewer's right eye B to the retina, and the degree of coherence of the right-eye image light rays is reduced. As a result, the image degradation, such as speckle resulting from the degree of coherence, can be reduced.

As mentioned above, the transmitted light selecting device in accordance with this Embodiment 1 includes the first light selecting unit 2a having the polarizing filter 4a for allowing an image light ray having one of polarization directions to pass therethrough, and the phase difference film 5A for providing phase differences to parts of the image light ray passing through the polarizing filter 4a to emit, as light in which light rays having a plurality of polarization directions coexist, the image light ray toward a viewer, and the second light selecting unit 2b having the polarizing filter 4b having a polarized light transmission axis whose direction is perpendicular to that of the polarizing filter 4a, and the phase difference film 5B for providing phase differences to parts of an image light ray passing through the polarizing filter 4b to emit, as light in which light rays having a plurality of polarization directions coexist, the image light ray toward the viewer, and each of the phase difference films 5A and 5B has at least two portions having polarized light transmission axes whose directions differ from each other and the polarizing filters are arranged on a side of the image display device and the phase difference films are arranged on a side of the viewer. When allowing the image light rays each having at least one of polarization directions, which are emitted from the image display device 3, to pass therethrough as the right-eye image and the left-eye image for the viewer, this transmitted light selecting device 2 provides phase differences to each of the image light rays of the right-eye image and the left-eye image which will be incident upon the viewer's eyes in such a way that each of the image light rays becomes light in which light rays having different polarization directions coexist. By doing in this way, the polarization states of each image light ray having the different polarization directions are mixed spatially before the image light ray reaches the retina, and the degree of coherence is therefore reduced. Therefore, speckle noise resulting from the optical system of the human being's eyes, i.e. a subjective speckle can be reduced, and the image degradation due to an image flicker can be reduced.

In above-mentioned Embodiment 1, although the case in which the image light rays of linear polarization from the image display device 3 are used is shown, the same advantages can be provided even in a case of using circularly polarized light rays. That is, in a system in which only a specific polarized light ray is extracted from a plurality of polarized light rays and is observed, there is apprehension that the speckle noise increases with increase in the degree of coherence regardless of the type of polarization (linear polarization, circular polarization or the like). In contrast with this, in accordance with the present invention, by increasing the types of polarizations again and then mixing these polarizations after only a specific polarized light ray is extracted for each eye, the degree of coherence is reduced.

Embodiment 2

Figure 3:
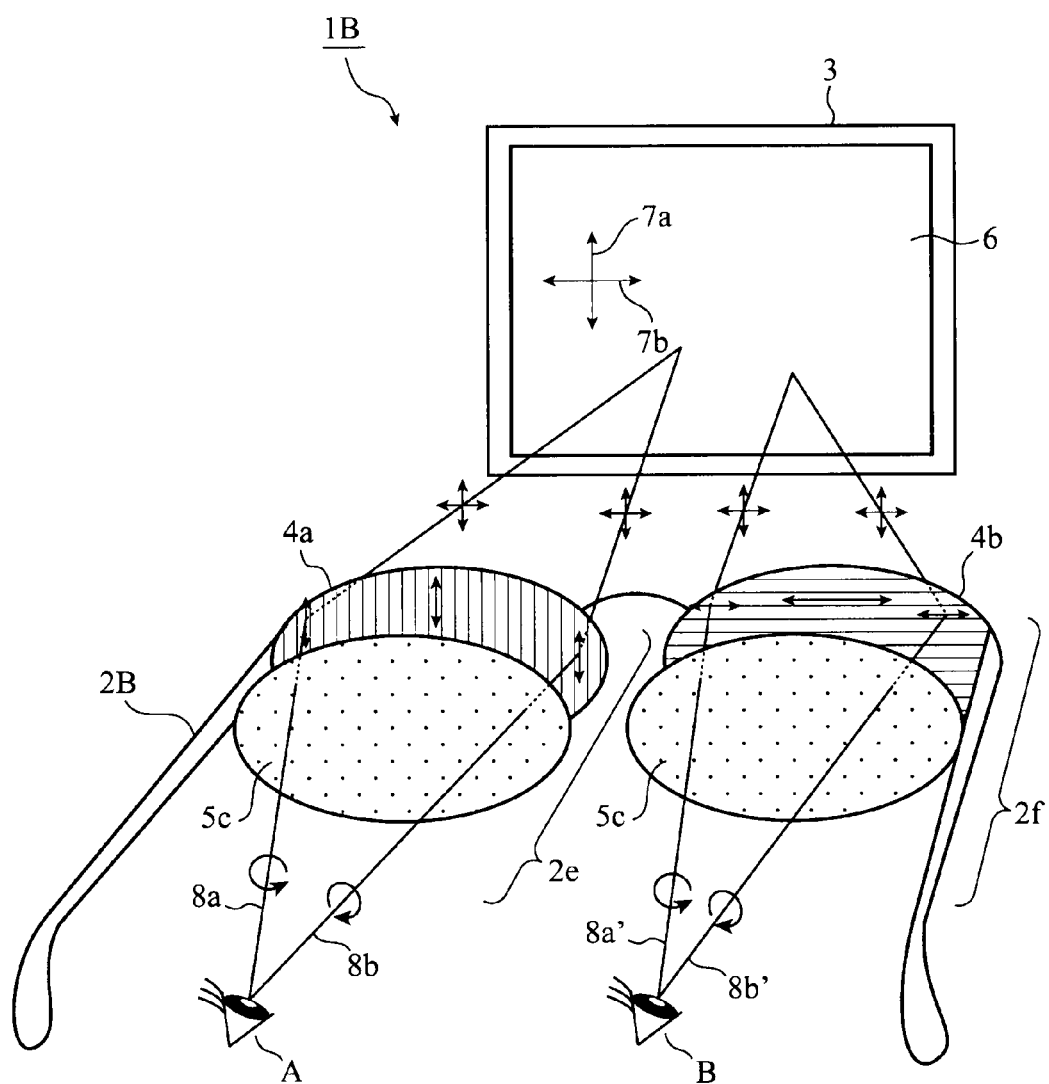
FIG. 3 is a view showing the structure of a three-dimensional image display device in accordance with Embodiment 2 of the present invention.

FIG. 3 is a view showing the structure of a three-dimensional image display device in accordance with Embodiment 2 of the present invention, and the same components as those of above-mentioned Embodiment 1 shown in FIG. 1 or like components are designated by the same reference numerals. In FIG. 3, the three-dimensional image display device 1B in accordance with Embodiment 2 enables a viewer to view an image on a screen 6 of an image display device 3 via a transmitted light selecting device 2B to make the viewer view the image displayed in three dimensions. The transmitted light selecting device 2B selectively allows an image light ray 7a of a left-eye image and an image light ray 7b of a right-eye image, which are displayed on the screen 6 of the image display device 3, to pass therethrough toward the viewer's left eye A and right eye B, respectively. For example, the transmitted light selecting device is formed in the form of glasses which the viewer can wear.

Furthermore, the transmitted light selecting device 2B is provided with a first light selecting unit 2e and a second light selecting unit 2f which correspond to the viewer's left eye A and right eye B, respectively. The first light selecting unit 2e includes a polarizing filter 4a and a phase difference film 5c, and the second light selecting unit 2f includes a polarizing filter 4b and a phase difference film 5c. The polarizing filter 4a has a function of selectively allowing the image light ray 7a for the viewer's left eye, among the image light rays 7a and 7b displayed on the screen 6 of the image display device 3, to pass therethrough according to its polarization direction, and the polarizing filter 4b has a function of selectively allowing the image light ray 7b for the viewer's right eye to pass therethrough according to its polarization direction, like those in accordance with above-mentioned Embodiment 1. The polarization directions of the polarizing filters 4a and 4b have a relation of being perpendicular to each other. Each of the phase difference films 5c is the one in which there exist polarized light transmission axes varying spatially within the film, i.e., the polarized light transmission axes are not aligned with one another. For example, the residual strain in the film should just vary spatially, and a sheet-shaped resin which is moderately thick and which is formed by extrusion is used as each of the phase difference films. Concretely, PET (PolyEthylene Terephthalate) or the like is used. In Embodiment 2, both the first light selecting unit 2e and the second light selecting unit 2f are constructed using the two phase difference films 5c of a single type.

Furthermore, in the first and second light selecting units 2e and 2f, the polarizing filters 4a and 4b are arranged on a side of the image display device 3, respectively, and the phase difference films 5c are arranged on a side of the viewer, respectively. In FIG. 3, for the sake of simplicity, although the polarizing filter and the phase difference film in each of the first and second light selecting units are shown in such a way as to be spatially apart from each other, they can be arranged in such a way as to be in spatial contact with each other.

The polarizing filter and the phase difference film can be bonded to each other with an adhesive or the like, or an optical film of the phase difference film can be formed on the polarizing filter with coating or the like. In case in which an air layer exists between the polarizing filter and the phase difference film, because their refractive indices differ greatly from that of the air, a loss due to Fresnel reflection of light occurs in each interface. Therefore, by forming the polarizing filter and the phase difference film into a single piece, the loss due to Fresnel reflection can be reduced.

Next, the details of an image display created by the three-dimensional image display device in accordance with Embodiment 2 will be explained. In the first light selecting unit 2e, the polarizing filter 4a selectively allows the image light ray 7a of the left-eye image displayed on the image display device 3 to pass therethrough. On the other hand, the image light ray 7b of the right-eye image having a polarization direction perpendicular to that of the image light ray 7a is selectively allowed to pass through by the polarizing filter 4b of the second light selecting unit 2f. The image light ray 7a which is allowed to pass through the polarizing filter 4a is given a phase difference by the phase difference film 5c, so that the polarization direction of the image light ray is changed. Similarly, the image light ray 7b which is allowed to pass through the polarizing filter 4b is given a phase difference by the phase difference film 5c, so that the polarization direction of the image light ray is changed.

When linearly-polarized light passes through a phase difference film, a phase difference is provided to the electric field vector of the electromagnetic wave and the linearly-polarized light typically changes to elliptically-polarized light. In the case in which there exist polarized light transmission axes varying spatially within the phase difference film, like in the case of each phase difference film 5c, the direction of the major axis of the elliptically polarized light in each region of the film plane differs. Furthermore, because each of the image light rays 7a and 7b from the image display device 3 has a divergence, the image light rays are incident upon the polarizing filters 4a and 4b with angles, respectively. More specifically, the image light ray 7a which is selectively allowed to pass through by the polarizing filter 4a is not perpendicular to the film plane of the phase difference film 5c, and is incident upon each region of the film plane with an angle. Similarly, the image light ray 7b which is selectively allowed to pass through by the polarizing filter 4b is not perpendicular to the film plane of the phase difference film 5c, and is incident upon each region of the film plane with an angle.

The polarization state of each of the image light rays 7a and 7b changes according to the directions of the polarized light transmission axes of the phase difference film 5c. For example, the image light ray 7a which is allowed to pass through the polarizing filter 4a of the first light selecting unit 2e passes through the phase difference film 5c as a first left-eye image light ray 8a and a second left-eye image light ray 8b while changing in its polarization state when passing through each incidence region of the film plane of the phase difference film 5c. That is, the first left-eye image light ray 8a and the second left-eye image light ray 8b differ from each other in their polarization states. Similarly, the image light ray 7b which is allowed to pass through the polarizing filter 4b of the second light selecting unit 2f passes through the phase difference film 5c as a first right-eye image light ray 8a' and a second right-eye image light ray 8b' while changing in its polarization state when passing through each incidence region of the film plane of the phase difference film 5c. The first right-eye image light ray 8a' and the second right-eye image light ray 8b' differ from each other in their polarization states.

The polarization state of the first left-eye image light ray 8a which is allowed to pass through the phase difference film 5c, and that of the second left-eye image light ray 8b which is allowed to pass through the phase difference film 5c are mixed spatially while the first and second left-eye image light rays propagate from the pupil of the viewer's left eye A to the retina. As a result, the first and second left-eye image light rays have polarizations perpendicular to each other, and the degree of coherence of the left-eye image light rays is reduced. Similarly, the polarization state of the first right-eye image light ray 8a' and that of the second right-eye image light ray 8b' are mixed spatially while the first and second right-eye image light rays propagate from the pupil of the viewer's right eye B to the retina, and the degree of coherence of the right-eye image light rays is reduced. As a result, the image degradation, such as speckle resulting from the degree of coherence, can be reduced.

In this Embodiment 2, because the transmitted light selecting device does not have a first phase difference film portion 5a and a second phase difference film portion 5b having a relation of their polarized light transmission axes being perpendicular to each other, unlike that in accordance with above-mentioned Embodiment 1, the polarization directions of the first left-eye image light ray 8a and the second left-eye image light ray 8b are not necessarily perpendicular to each other. Similarly, the first right-eye image light ray 8a' and the second right-eye image light ray 8b' do not necessarily satisfy the relation of their polarized light transmission axes being perpendicular to each other. Therefore, although the reduction of the degree of coherence is inferior to that provided by above-mentioned Embodiment 1, the whole structure of the transmitted light selecting device can be simplified.

Figure 4:
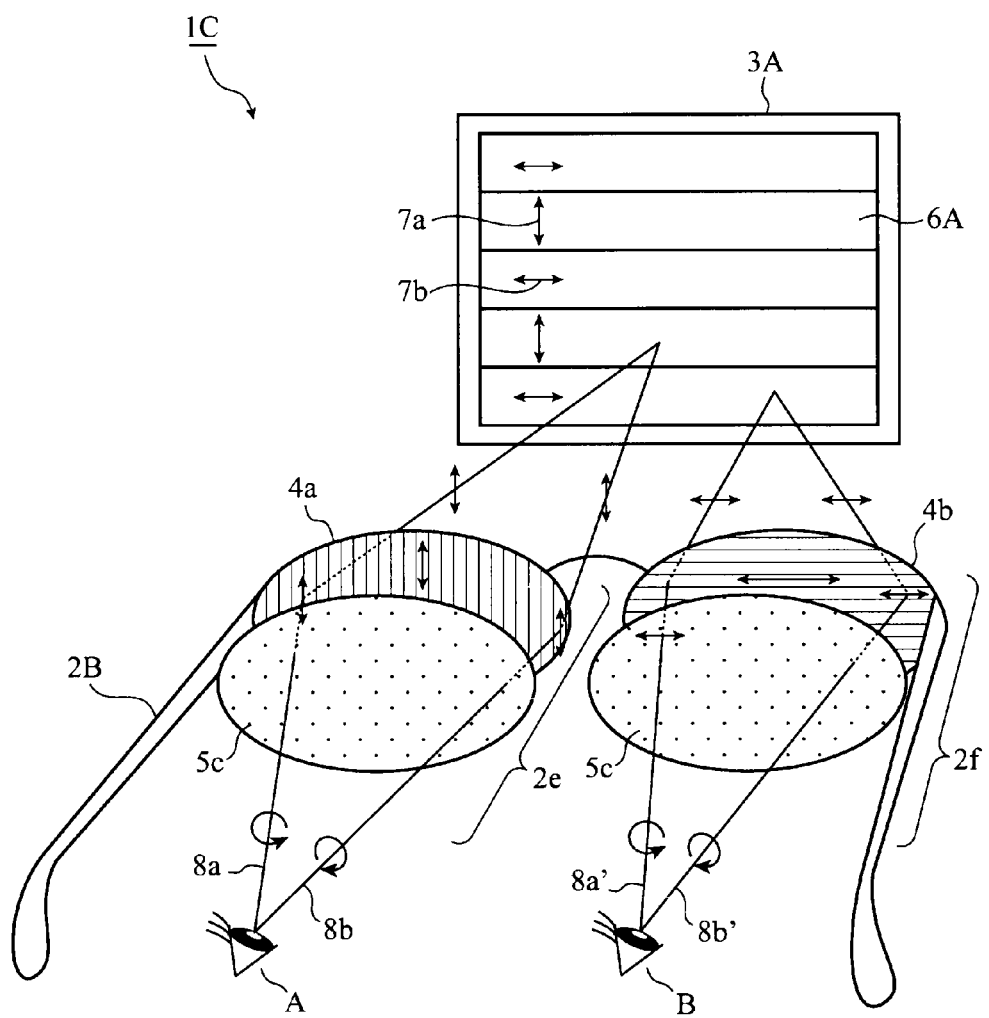
FIG. 4 is a view showing another example of the structure of the three-dimensional image display device in accordance with Embodiment 4.

FIG. 4 is a view showing another example of the structure of the three-dimensional image display device in accordance with Embodiment 2. In this figure, the same components as those shown in FIG. 3 are designated by the same reference numerals. Although the three-dimensional image display device 1C uses the transmitted light selecting device 2B, like in the case of the structure of FIG. 3, an image display device 3A has a display function different from that of the image display device shown in FIG. 3. More specifically, as shown in FIG. 4, the image display device 3A spatially divides a screen 6A into regions each of which to display an image light ray 7a of a left-eye image and regions each of which to display an image light ray 7b of a right-eye image to display an image on the screen. Also in this structure, because the transmitted light selecting device 2B selectively allows the image light rays 7a of the left-eye image and the image light rays 7b of the right-eye image to pass therethrough toward the viewer's left eye A and right eye B, respectively, as mentioned above, the same advantages as those provided by the structure of FIG. 3 can be provided. Furthermore, even in a case of applying the image display device 3A to the three-dimensional image display device in accordance with above-mentioned Embodiment 1, the same advantages can be provided.

As mentioned above, the transmitted light selecting device in accordance with this Embodiment 2 includes the first light selecting unit 2e having the polarizing filter 4a for allowing an image light ray having one of polarization directions to pass therethrough, and the phase difference film 5c for providing phase differences to parts of the image light ray passing through the polarizing filter 4a to emit, as light in which light rays having a plurality of polarization directions coexist, the image light ray toward a viewer, and the second light selecting unit 2f having the polarizing filter 4b having a polarized light transmission axis whose direction is perpendicular to that of the polarizing filter 4a, and the phase difference film 5c for providing phase differences to parts of an image light ray passing through the polarizing filter 4b to emit, as light in which light rays having a plurality of polarization directions coexist, the image light ray toward the viewer, and the polarizing filters are arranged on a side of the image display device and the phase difference films are arranged on a side of the viewer. While allowing the image light rays each having at least one of polarization directions, which are emitted from the image display device 3A, to pass therethrough as the right-eye image and the left-eye image for the viewer, this transmitted light selecting device 2B provides phase differences to each of the image light rays of the right-eye image and the left-eye image which will be incident upon the viewer's eyes in such a way that each of the image light rays becomes light in which light rays having different polarization directions coexist. By doing in this way, the polarization states of each image light ray having polarization directions perpendicular to each other are mixed spatially before the image light ray reaches the retina, and the degree of coherence is therefore reduced. Therefore, speckle noise resulting from the optical system of the human being's eyes, i.e. a subjective speckle can be reduced, and the image degradation due to an image flicker can be reduced. Furthermore, because the first phase difference film portion 5a and the second phase difference film portion 5b are unnecessary and the two phase difference films 5c of a single type are used, the structure of the transmitted light selecting device 2B can be simplified.

Embodiment 3

Figure 5:
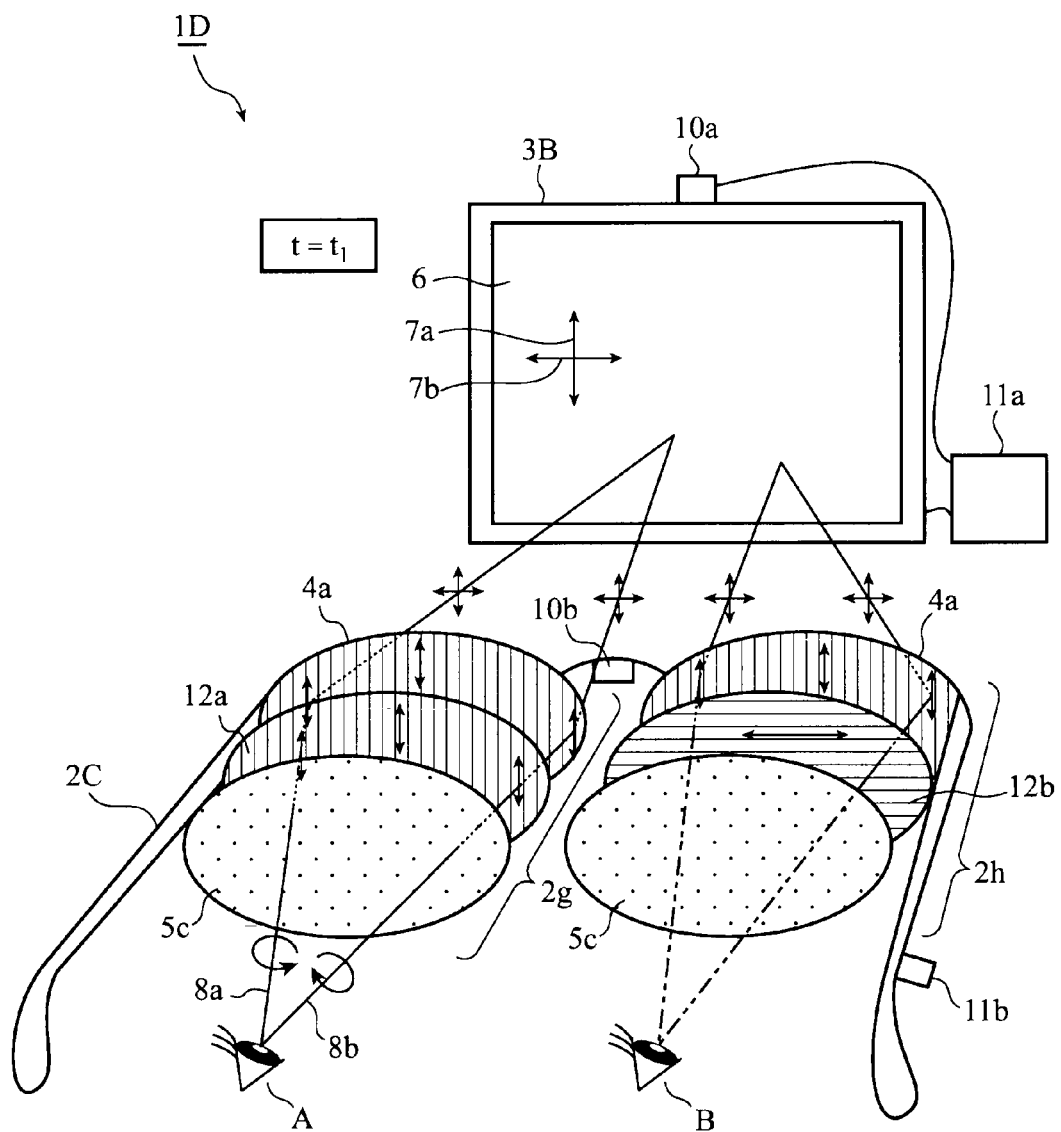
FIG. 5 is a view showing the structure of a three-dimensional image display device in accordance with Embodiment 3 of the present invention (time t=t1)
Figure 6:
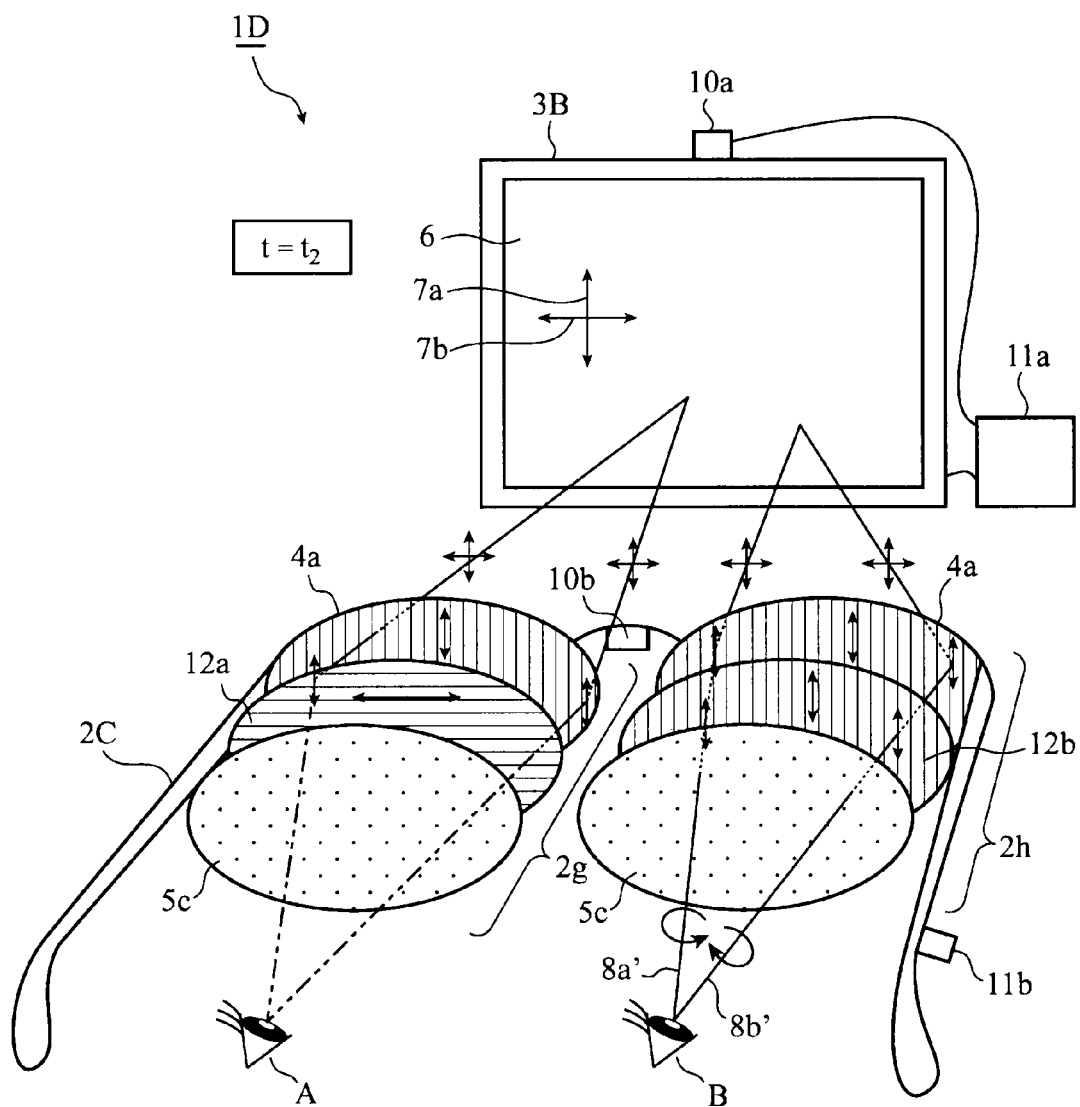
FIG. 6 is a view showing the structure of the three-dimensional image display device in accordance with Embodiment 3 of the present invention (time t=t2)

FIGS. 5 and 6 are views showing the structure of a three-dimensional image display device in accordance with Embodiment 3 of the present invention. FIG. 5 shows a case of a time t=t1, and FIG. 6 shows a case in which a time t=t2 comes after a shutter switching time period has elapsed after the time t1. In FIGS. 5 and 6, the same components as those shown in above-mentioned Embodiments 1 and 2 or like components are designated by the same reference numerals. In FIGS. 5 and 6, the three-dimensional image display device 1D in accordance with Embodiment 3 enables a viewer to view an image on a screen 6 of an image display device 3B via a transmitted light selecting device 2C to make the viewer view the image displayed in three dimensions. Furthermore, the image display device 3B alternately displays image light rays 7a and 7b having polarization directions perpendicular to each other in a time sequence by using an internal display control unit (not shown).

The transmitted light selecting device 2C selectively allows one of the image light ray 7a and the image light ray 7b, which are displayed on the screen 6 of the image display device 3B, to pass therethrough alternately toward the viewer's left eye A and right eye B. For example, the transmitted light selecting device is formed in the form of glasses which the viewer can wear. Furthermore, the transmitted light selecting device 2C is provided with a first light selecting unit 2g and a second light selecting unit 2h which correspond to the viewer's left eye A and right eye B, respectively, and a communication unit 10b and a control unit 11b. The communication unit 10b is a component for communicating with a communication unit 10a disposed in the image display device 3B. A communication method of communicating between the communication units 10a and 10b, infrared ray communications or short range radio communications, such as Bluetooth (registered trademark), can be used, for example. A control unit 11a is a component for acquiring time series information showing a timing with which to display each of the image light rays 7a and 7b having polarization directions perpendicular to each other from the above-mentioned display control unit and then notifying this time series information to the transmitted light selecting device 2C via the communication unit 10a.

In the transmitted light selecting device 2C, the first light selecting unit 2g is provided with a polarizing filter 4a, a shutter 12a and a phase difference film 5c, and the second light selecting unit 2h is provided with a polarizing filter 4a, a shutter 12b and a phase difference film 5c. Each of the polarizing filters 4a has a function of selectively allowing one of the image light rays 7a and 7b displayed on the screen 6 of the image display device 3, to pass therethrough according to their polarization directions, like that in accordance with above-mentioned Embodiment 1. Furthermore, each of the phase difference films 5c is the one in which there exist polarized light transmission axes varying spatially within the film, like that in accordance with above-mentioned Embodiment 2.

Each of the shutters 12a and 12b is a polarizer capable of rotating the direction of its polarized light transmission axis in steps of 90 degrees, and is attached to the polarizing filter 4a and functions as a shutter for enabling or disabling one image light ray having a predetermined polarization direction, among the image light ray which is allowed to pass through the polarizing filter 4a, to pass therethrough. The control unit 11b is a component for controlling the rotation of the direction of the polarized light transmission axis of each of the shutters 12a and 12b, and rotates the direction of the polarized light transmission axis of each of the shutters 12a and 12b according to the time series information received from the image display device 3B via the communication unit 10b.

Next, the details of an image display created by the three-dimensional image display device in accordance with Embodiment 3 will be explained. First, the control unit 11a acquires the time series information showing the timing with which each of the image light rays 7a and 7b having polarization directions perpendicular to each other is displayed by the display control unit of the image display device 3B from the above-mentioned display control unit, and then notifies the time series information to the transmitted light selecting device 2C via the communication unit 10a. The control unit 11b of the transmitted light selecting device 2C controls the rotation of the direction of the polarized light transmission axis of each of the shutters 12a and 12b in synchronization with the display timing shown by the above-mentioned time series information received thereby via the communication unit 10b.

In the example shown in FIG. 5, the control unit 11b controls the rotation of the polarized light transmission axis of the shutter 12a of the first light selecting unit 2g at the time of t=t1 in synchronization with the display timing shown by the above-mentioned time series information in such a way that the polarized light transmission axis is parallel to the polarizing filter 4a, and also controls the rotation of the polarized light transmission axis of the shutter 12b of the second light selecting unit 2h in such a way that the polarized light transmission axis is perpendicular to the polarizing filter 4a. At this time, the image light ray 7a displayed on the screen 6 of the image display device 3B is allowed to pass through each of the polarizing filters 4a of the first and second light selecting units 2g and 2h, and is incident upon each of the shutters 12a and 12b. At this time, because the shutter 12a has a polarized light transmission axis parallel to the polarizing filter 4a, the image light ray 7a is allowed to passed through the shutter 12a, whereas because the shutter 12b has a polarized light transmission axis perpendicular to the polarizing filter 4a, the image light ray 7a is not allowed to pass through the shutter 12b.

The image light ray 7a which is allowed to pass through the shutter 12a passes through the phase difference film 5c as a first left-eye image light ray 8a and a second left-eye image light ray 8b while changing in its polarization state when passing through each incidence region of the film plane of the phase difference film 5c. The first left-eye image light ray 8a and the second left-eye image light ray 8b passing through the phase difference film 5c propagate from the pupil of the viewer's left eye A to the retina, and are observed by the viewer. At this time, the image light ray 7a is observed only by the viewer's left eye A while the image light ray 7a does not reach the right eye B. The polarization state of the first left-eye image light ray 8a and that of the second left-eye image light ray 8b are mixed spatially while the first and second left-eye image light rays propagate from the pupil of the viewer's left eye A to the retina. As a result, the first and second left-eye image light rays have polarizations perpendicular to each other, and the degree of coherence of the left-eye image light rays is reduced.

In contrast, in the example shown in FIG. 6, the control unit 11b controls the rotation of the polarized light transmission axis of the shutter 12a of the first light selecting unit 2g at the time of t=t2 (t2>t1) in synchronization with the display timing shown by the above-mentioned time series information in such a way that the polarized light transmission axis is perpendicular to the polarizing filter 4a, and also controls the rotation of the polarized light transmission axis of the shutter 12b of the second light selecting unit 2h in such a way that the polarized light transmission axis is parallel to the polarizing filter 4a. At this time, the image light ray 7a displayed on the screen 6 of the image display device 3B is allowed to pass through each of the polarizing filters 4a of the first and second light selecting units 2g and 2h, and is incident upon each of the shutters 12a and 12b. At this time, because the shutter 12a has a polarized light transmission axis perpendicular to the polarizing filter 4a, the image light ray 7a is not allowed to passed through the shutter 12a, whereas because the shutter 12b has a polarized light transmission axis parallel to the polarizing filter 4a, the image light ray 7a is allowed to pass through the shutter 12b.

The image light ray 7a which is allowed to pass through the shutter 12b passes through the phase difference film 5c as a first right-eye image light ray 8a' and a second right-eye image light ray 8b' while changing in its polarization state when passing through each incidence region of the film plane of the phase difference film 5c. The first right-eye image light ray 8a' and the second right-eye image light ray 8b' passing through the phase difference film 5c propagate from the pupil of the viewer's right eye B to the retina, and are observed by the viewer. At this time, the image light ray 7a is observed only by the viewer's right eye B while the image light ray 7a does not reach the left eye A. The polarization state of the first right-eye image light ray 8a' and that of the second right-eye image light ray 8b' are mixed spatially while the first and second right-eye image light rays propagate from the pupil of the viewer's right eye B to the retina. As a result, the first and second right-eye image light rays have polarizations perpendicular to each other, and the degree of coherence of the right-eye image light rays is reduced.

By repeating the state at the time t1 and the state at the time t2 alternately in synchronization with the display timings of the image light rays 7a and 7b having polarization directions perpendicular to each other, the viewer is enabled to view the image displayed on the screen 6 of the image display device 3B in three dimensions. In either of the cases of FIGS. 5 and 6, the image light ray 7a has a high degree of coherence after passing through the polarizing filter 4a because it has a single polarization direction. Therefore, the speckle noise increases with increase in the degree of coherence if the image light ray having a single polarization direction enters the viewer's eyes just as it is. Therefore, by increasing the types of polarizations again by using the phase difference films and then mixing these polarizations after extracting only one specific polarized light, the degree of coherence is reduced, like in the case of above-mentioned Embodiment 1 and 2. As a result, the speckle noise can be reduced, and therefore the image degradation can be suppressed.

Although the example in which the phase difference films 5c are arranged as shown in above-mentioned Embodiment 2 is shown in the above-mentioned explanation, it is needless to say that phase difference films 5A and 5B as shown in above-mentioned Embodiment 1 can be arranged instead.

As mentioned above, the transmitted light selecting device in accordance with this Embodiment 3 is provided with the communication unit 10b for receiving a timing with which to display each of images having polarization directions perpendicular to each other from the image display device 3B, the shutter 12a disposed between the polarizing filter 4a and the phase difference film 5c in the first light selecting unit 2g, and capable of alternately switching the direction of its polarized light transmission axis between two directions perpendicular to each other, the shutter 12b disposed between the polarizing filter 4b and the phase difference film 5c in the second light selecting unit 2h, and capable of alternately switching the direction of its polarized light transmission axis between two directions perpendicular to each other, and the control unit 11b for controlling the switching of the polarized light transmission axis of each of the shutters 12a and 12b with the display timings received by the communication unit 10b. By doing in this way, the polarization states of the image light rays having polarization directions different from each other are mixed spatially before the image light rays reach the retina, and the degree of coherence is reduced. Therefore, the speckle noise resulting from the optical system of the human being's eyes, i.e. a subjective speckle can be reduced, and the image degradation due to an image flicker can be reduced.

Furthermore, in above-mentioned Embodiment 3, for example, the polarizing filter 4a of the second light selecting unit 2h can be replaced by the polarizing filter 4b shown in above-mentioned Embodiments 1 and 2 and the shutter 12b can be controlled to allow the image light ray 7b displayed on the image display device 3B to pass through the shutter in such a way that the first right-eye image light ray 8a' and the second right-eye image light ray 8b' generated from the image light ray 7b having a polarization direction perpendicular to that of the image light ray 7a are observed by the viewer's right eye B. Even when the transmitted light selecting device is constructed in this way, the same advantages as those provided by above-mentioned Embodiment 3 are provided.

Embodiment 4

Figure 7:
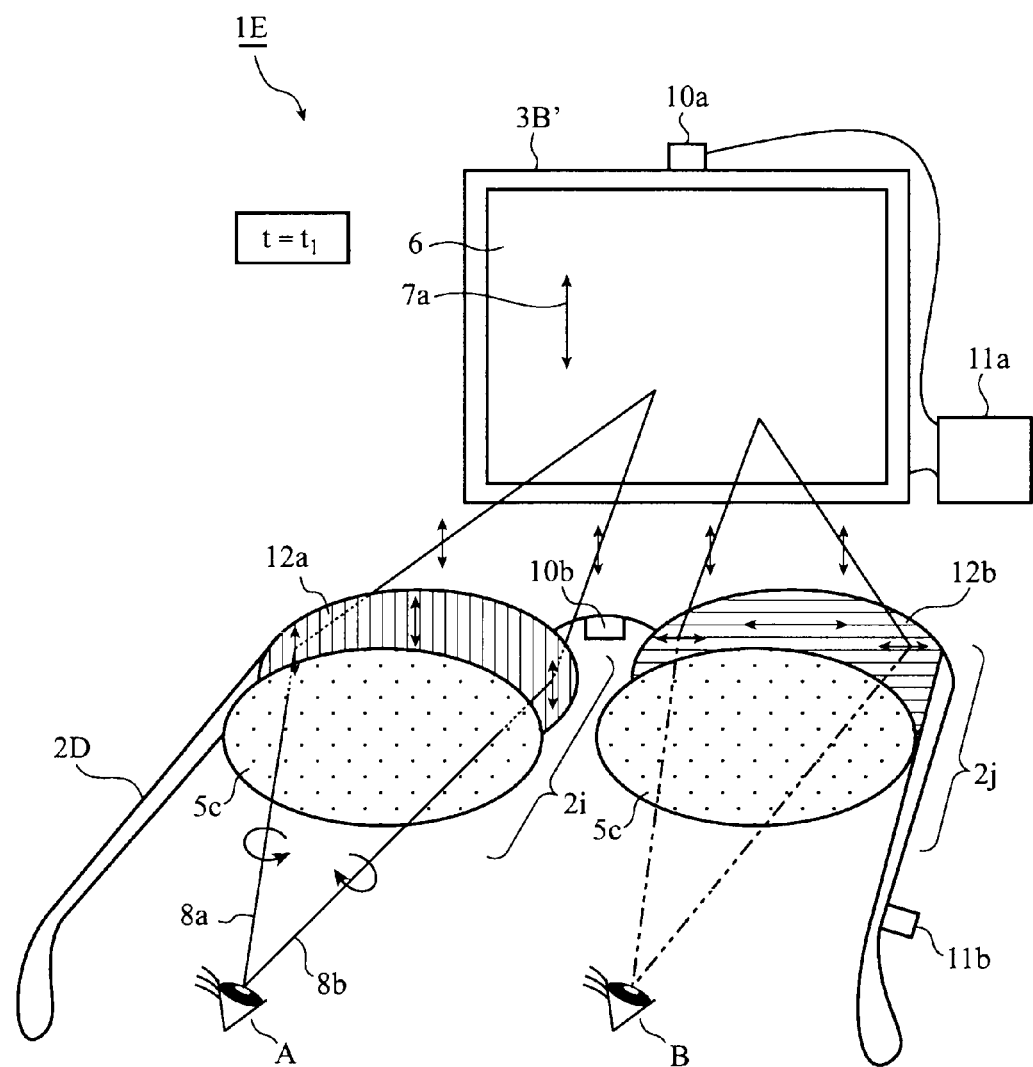
FIG. 7 is a view showing the structure of a three-dimensional image display device in accordance with Embodiment 4 of the present invention (time t=t1)
Figure 8:
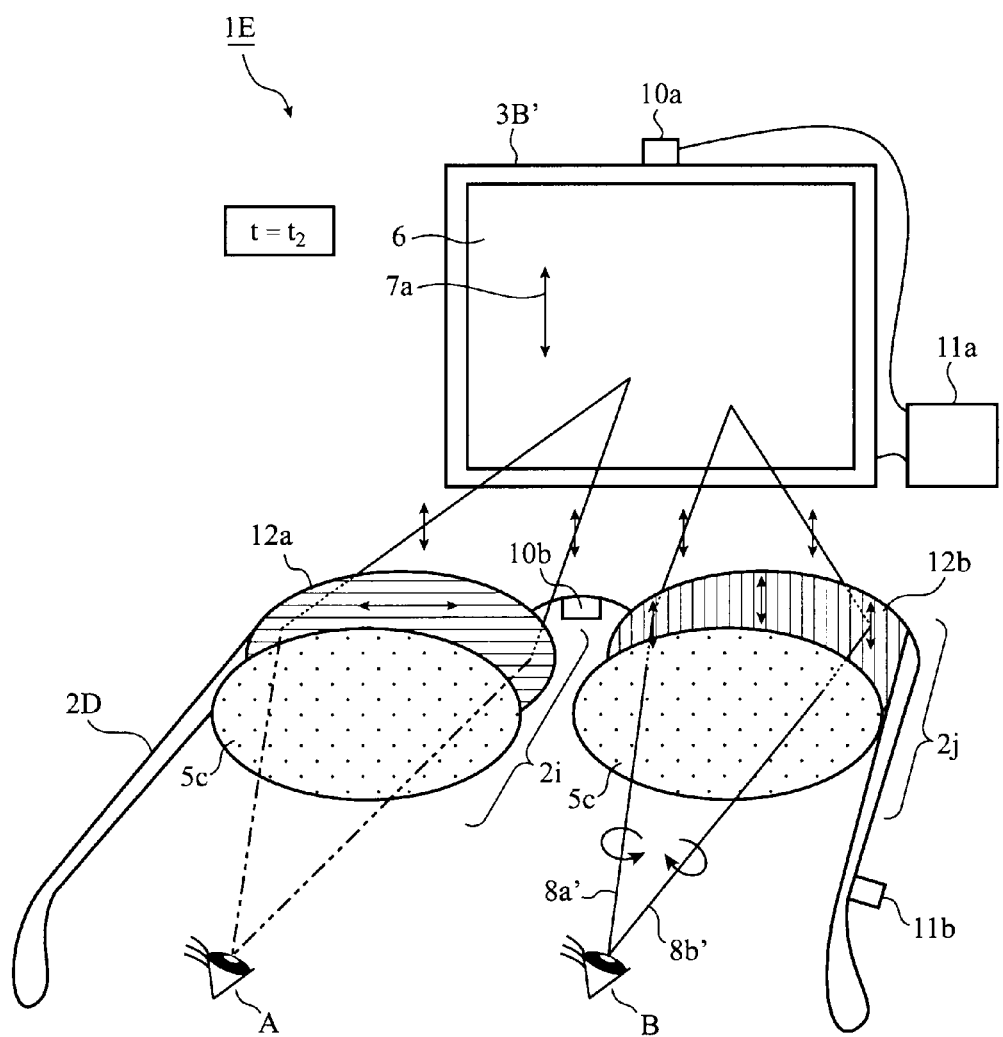
FIG. 8 is a view showing the structure of the three-dimensional image display device in accordance with Embodiment 4 of the present invention (time t=t2)

FIGS. 7 and 8 are views showing the structure of a three-dimensional image display device in accordance with Embodiment 4 of the present invention. FIG. 7 shows a case of a time t=t1, and FIG. 8 shows a case in which a time t=t2 comes after a shutter switching time period has elapsed after the time t1. In FIGS. 7 and 8, the same components as those shown in above-mentioned Embodiments 1 and 2 or like components are designated by the same reference numerals. In FIGS. 7 and 8, the three-dimensional image display device 1E in accordance with Embodiment 4 enables a viewer to view an image on a screen 6 of an image display device 3B' via a transmitted light selecting device 2D to make the viewer view the image displayed in three dimensions. Furthermore, the image display device 3B' alternately displays an image light ray 7a having a fixed polarization direction in a time series by using an internal display control unit (not shown), unlike that in accordance with above-mentioned Embodiment 3.

The transmitted light selecting device 2D selectively allows the image light ray 7a, which is displayed on the screen 6 of the image display device 3B', to pass therethrough alternately toward the viewer's left eye A and right eye B. For example, the transmitted light selecting device is formed in the form of glasses which the viewer can wear. Furthermore, the transmitted light selecting device 2D is provided with a first light selecting unit 2i and a second light selecting unit 2j which correspond to the viewer's left eye A and right eye B, respectively, and a communication unit 10b and a control unit 11b. The communication unit 10b is a component for communicating with a communication unit 10a disposed in the image display device 3B'. A communication method of communicating between the communication units 10a and 10b, infrared ray communications or short range radio communications, such as Bluetooth (registered trademark), can be used, for example. A control unit 11a is a component for acquiring time series information showing a timing with which to display the image light ray 7a having a fixed polarization direction from the above-mentioned display control unit and then notifying this time series information to the transmitted light selecting device 2D via the communication unit 10a.

In the transmitted light selecting device 2D, the first light selecting unit 2i is provided with a shutter 12a and a phase difference film 5c, and the second light selecting unit 2j is provided with a shutter 12b and a phase difference film 5c. Each of the phase difference films 5c is the one in which there exist polarized light transmission axes varying spatially within the film, like that in accordance with above-mentioned Embodiment 2. Each of the shutters 12a and 12b is a polarizer capable of rotating the direction of its polarized light transmission axis in steps of 90 degrees, and functions as a shutter for enabling or disabling the image light ray having a fixed polarization direction displayed on the image display device 3B' to pass therethrough. The control unit 11b is a component for controlling the rotation of the direction of the polarized light transmission axis of each of the shutters 12a and 12b, and rotates the direction of the polarized light transmission axis of each of the shutters 12a and 12b according to the time series information received from the image display device 3B' via the communication unit 10b.

Next, the details of an image display created by the three-dimensional image display device in accordance with Embodiment 4 will be explained. First, the control unit 11a acquires the time series information showing the timing with which the image light ray 7a having a fixed polarization direction is displayed by the display control unit of the image display device 3B' from the above-mentioned display control unit, and then notifies the time series information to the transmitted light selecting device 2D via the communication unit 10a. The control unit 11b of the transmitted light selecting device 2D controls the rotation of the direction of the polarized light transmission axis of each of the shutters 12a and 12b in synchronization with the display timing shown by the above-mentioned time series information received thereby via the communication unit 10b.

In the example shown in FIG. 7, the control unit 11b controls the rotation of the polarized light transmission axis of the shutter 12a of the first light selecting unit 2i at the time of t=t1 in synchronization with the display timing shown by the above-mentioned time series information in such a way that the polarized light transmission axis matches the polarization direction of the image light ray 7a, and also controls the rotation of the polarized light transmission axis of the shutter 12b of the second light selecting unit 2j in such a way that the polarized light transmission axis is perpendicular to the polarization direction of the image light ray 7a. At this time, the image light ray 7a displayed on the screen 6 of the image display device 3B' is incident upon each of the shutters 12a and 12b of the first and second light selecting units 2i and 2j. At this time, because the shutter 12a has a polarized light transmission axis matching the polarization direction of the image light ray 7a, the image light ray 7a is allowed to pass through the shutter 12a, whereas because the shutter 12b has a polarized light transmission axis perpendicular to the polarization direction of the image light ray 7a, the image light ray 7a is not allowed to pass through the shutter 12b.

The image light ray 7a which is allowed to pass through the shutter 12a passes through the phase difference film 5c as a first left-eye image light ray 8a and a second left-eye image light ray 8b while changing in its polarization state when passing through each incidence region of the film plane of the phase difference film 5c. The first left-eye image light ray 8a and the second left-eye image light ray 8b passing through the phase difference film 5c propagate from the pupil of the viewer's left eye A to the retina, and are observed by the viewer. At this time, the image light ray 7a is observed only by the viewer's left eye A while the image light ray 7a does not reach the right eye B. The polarization state of the first left-eye image light ray 8a and that of the second left-eye image light ray 8b are mixed spatially while the first and second left-eye image light rays propagate from the pupil of the viewer's left eye A to the retina. As a result, the first and second left-eye image light rays have polarizations perpendicular to each other, and the degree of coherence of the left-eye image light rays is reduced.

In contrast, in the example shown in FIG. 8, the control unit 11b controls the rotation of the polarized light transmission axis of the shutter 12a of the first light selecting unit 2i at the time of t=t2 (t2>t1) in synchronization with the display timing shown by the above-mentioned time series information in such a way that the polarized light transmission axis is perpendicular to the polarization direction of the image light ray 7a, and also controls the rotation of the polarized light transmission axis of the shutter 12b of the second light selecting unit 2j in such a way that the polarized light transmission axis matches the polarization direction of the image light ray 7a. At this time, the image light ray 7a displayed on the screen 6 of the image display device 3B' is incident upon each of the shutters 12a and 12b of the first and second light selecting units 2i and 2j. At this time, because the shutter 12a has a polarized light transmission axis perpendicular to the polarization direction of the image light ray 7a, the image light ray 7a is not allowed to pass through the shutter 12a, whereas because the shutter 12b has a polarized light transmission axis matching the polarization direction of the image light ray 7a, the image light ray 7a is allowed to pass through the shutter 12b.

The image light ray 7a which is allowed to pass through the shutter 12b passes through the phase difference film 5c as a first right-eye image light ray 8a' and a second right-eye image light ray 8b' while changing in its polarization state when passing through each incidence region of the film plane of the phase difference film 5c. The first right-eye image light ray 8a' and the second right-eye image light ray 8b' passing through the phase difference film 5c propagate from the pupil of the viewer's right eye B to the retina, and are observed by the viewer. At this time, the image light ray 7a is observed only by the viewer's right eye B while the image light ray 7a does not reach the left eye A. The polarization state of the first right-eye image light ray 8a' and that of the second right-eye image light ray 8b' are mixed spatially while the first and second right-eye image light rays propagate from the pupil of the viewer's right eye B to the retina. As a result, the first and second right-eye image light rays have polarizations perpendicular to each other, and the degree of coherence of the right-eye image light rays is reduced.

By repeating the state at the time t1 and the state at the time t2 alternately in synchronization with the display timing of the image light ray 7a having a fixed polarization direction, the viewer is enabled to view the image displayed on the screen 6 of the image display device 3B' in three dimensions. In either of the cases of FIGS. 7 and 8, the image light ray 7a has a high degree of coherence after passing through each of the shutters 12a and 12b because it has a single polarization direction. Therefore, the speckle noise increases with increase in the degree of coherence if the image light ray having a single polarization direction enters the viewer's eyes just as it is. Therefore, by increasing the types of polarizations again by using the phase difference films and then mixing these polarizations after extracting one specific polarized light by using the shutters 12a and 12b, the degree of coherence is reduced, like in the case of above-mentioned Embodiments 1 and 2. As a result, the speckle noise can be reduced, and therefore the image degradation can be suppressed.

Although the example in which the phase difference films 5c are arranged as shown in above-mentioned Embodiment 2 is shown in the above-mentioned explanation, it is needless to say that phase difference films 5A and 5B as shown in above-mentioned Embodiment 1 can be arranged instead.

As mentioned above, the transmitted light selecting device in accordance with this Embodiment 4 is provided with the communication unit 10b for receiving a timing with which to display each of images having polarization directions perpendicular to each other from the image display device 3B, the first light selecting unit 2i having the shutter 12a capable of alternately switching the direction of its polarized light transmission axis between ones perpendicular to each other, and the phase difference film 5c for providing phase differences to light rays passing through the shutter 12a to emit the light rays toward the viewer, the second light selecting unit 2j having the shutter 12b capable of alternately switching the direction of its polarized light transmission axis between ones perpendicular to each other, and the phase difference film 5c for providing phase differences to light rays passing through the shutter 12b to emit the light rays toward the viewer, and the control unit 11b for controlling the switching of the polarized light transmission axis of each of the shutters 12a and 12b with the display timing received by the communication unit 10b in such a way that the polarized light transmission axes of the shutters 12a and 12b are perpendicular to each other. By doing in this way, the polarization states of the image light rays having polarization directions different from each other are mixed spatially before the image light rays reach the retina, and the degree of coherence is reduced. Therefore, the speckle noise resulting from the optical system of the human being's eyes, i.e. a subjective speckle can be reduced, and the image degradation due to an image flicker can be reduced.

Furthermore, in above-mentioned Embodiment 4, the image display device 3B' can be replaced by the image display device 3B shown in above-mentioned Embodiment 3 and the shutter 12b can be controlled to allow the image light ray 7b displayed on the image display device 3B to pass through the shutter in such a way that the first right-eye image light ray 8a' and the second right-eye image light ray 8b' generated from the image light ray 7b having a polarization direction perpendicular to that of the image light ray 7a are observed by the viewer's right eye B. Even when the transmitted light selecting device is constructed in this way, the same advantages as those provided by above-mentioned Embodiment 4 are provided.

Embodiment 5

Figure 9:
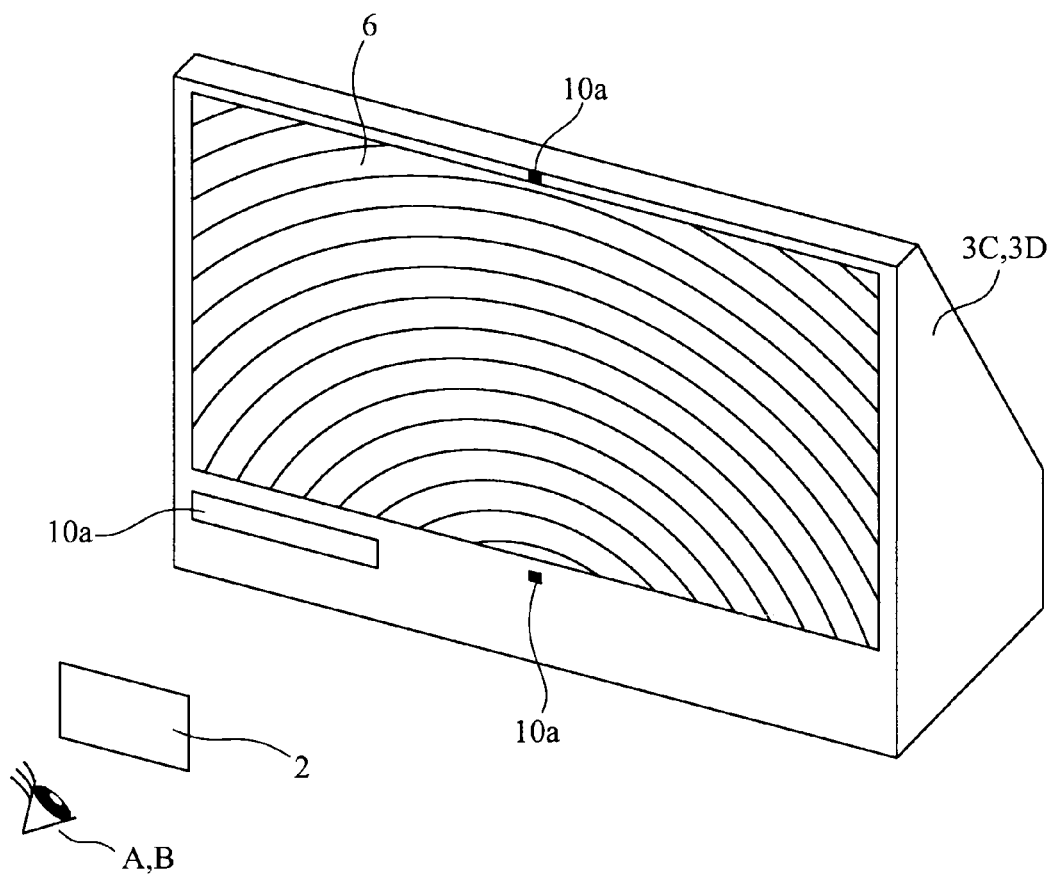
FIG. 9 is a view schematically showing the structure of a three-dimensional image display device in accordance with Embodiment 5 of the present invention.

FIG. 9 is a view schematically showing the structure of a three-dimensional image display device in accordance with Embodiment 5 of the present invention. The three-dimensional image display device shown in FIG. 9 enables a viewer to view an image on a screen 6 of an image display device 3C or 3D, which will be mentioned below, via a transmitted light selecting device 2 to make the viewer view the image displayed in three dimensions. In this embodiment, the transmitted light selecting devices 2 is one of the transmitted light selecting devices 2 to 2D shown in above-mentioned Embodiments 1 to 4, and selectively allows image light rays displayed on the screen 6 of the image display device 3C or 3D to pass therethrough toward a viewer's left eye A and right eye B. Furthermore, the image display device 3C or 3D is provided with communication units 10a each for communicating with a communication unit 10b (not shown) which is disposed in the transmitted light selecting device 2, like those in accordance with above-mentioned Embodiments 3 and 4. In a case of alternately displaying a left-eye image and a right-eye image in a time series, the image display device 3C or 3D can select one image light ray in the same way that those in accordance with above-mentioned Embodiments 3 and 4 do by notifying time series information showing a timing with which the image display device 3C or 3D displays the left-eye image or the right-eye image to the transmitted light selecting device 2 via the communication units 10a.

Although in the example of FIG. 9, a case in which the communication units 10a are arranged in a front portion of the device on a lower left side of the screen 6, in an upper portion of the device on a center line dividing the screen 6 into right and left parts, and in a lower portion of the device on the center line is shown, they can be arranged at arbitrary positions as long as they are arranged at positions where they can easily communicate with the communication unit 10b of the transmitted light selecting device 2. For example, in a case in which the transmitted light selecting device 2 is formed in the form of glasses, although it is preferable that one communication unit 10a is arranged in a part of the device on the center line of the screen 6 because the transmitted light selecting device 2 is placed at the same height as that of the viewer's line of sight when the viewer wears the transmitted light selecting device, one communication unit 10a can be arranged in a rear portion of the screen 6.

Figure 10:
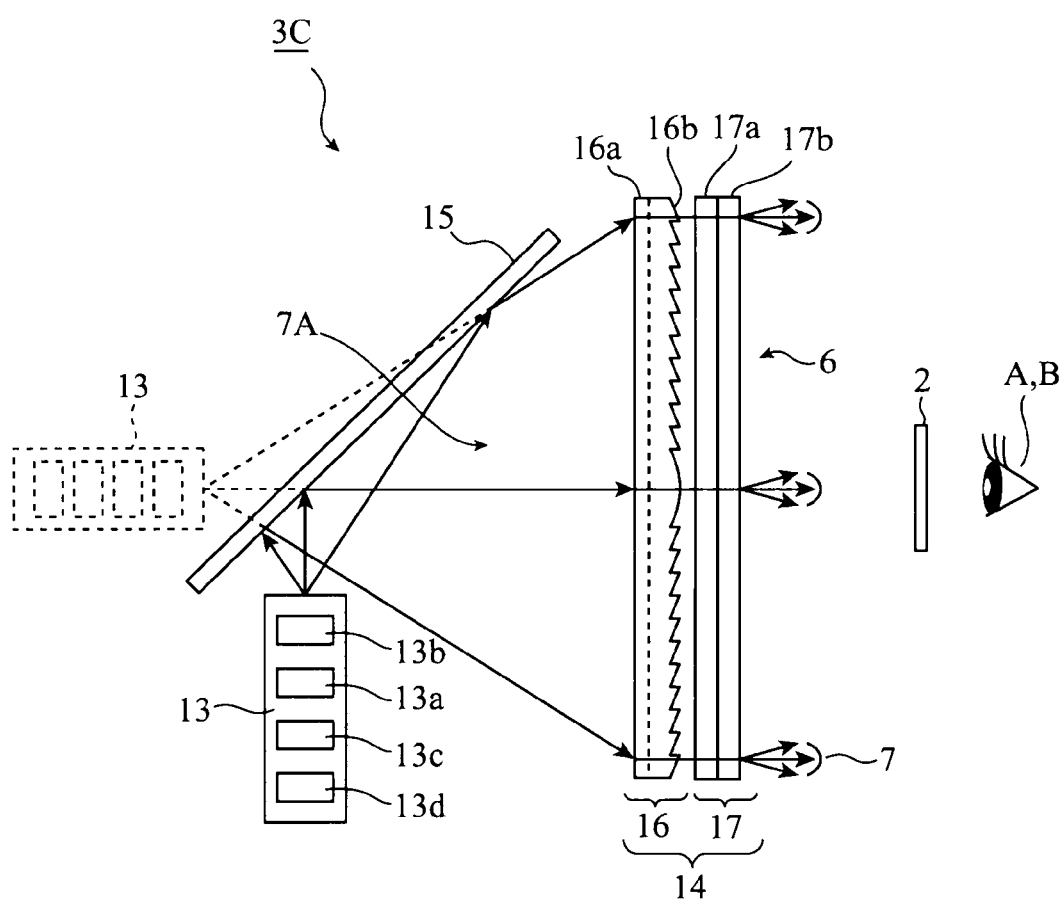
FIG. 10 is a view showing the structure of an image display device in accordance with Embodiment 5.

FIG. 10 is a view showing the structure of the image display device in accordance with Embodiment 5. In FIG. 10, the image display device 3C is provided with a projector 13, a transparent screen 14, and a reflector 15. The projector 13 is a component for outputting rays of light to be projected 7A of a display image, and is provided with a spatial light modulator 13a, a projection optical system 13b, an illuminating optical system 13c, and a light source 13d. The spatial light modulator 13a is a component for controlling the polarizations of the rays of light to be projected 7A, and performs a polarization modulation on light from the projection optical system 13b to create the rays of light to be projected 7A having polarization directions perpendicular to each other. The projection optical system 13b creates the rays of light to be projected 7A of the display image by using illumination light from the illuminating optical system 13c. The illuminating optical system 13c creates the illumination light on the basis of light emitted by the light source 13d. The light source 13d emits the light having light rays having three different wavelength bands corresponding to at least 3 primary colors, and is comprised of a plurality of laser light sources, LEDs, or the like.

The transparent screen 14 is the one onto which the rays of light to be projected 7A from the projector 13 are projected, and is provided with a Fresnel lens screen 16 and a light diffusing part 17. The Fresnel lens screen 16 is a Fresnel optical element for bending the rays of light to be projected 7A from the projector 13 toward the viewer, and is comprised of a Fresnel lens board 16a and a light exiting surface side Fresnel lens 16b. The light diffusing part 17 is a component for providing an angle of divergence to the rays of light to be projected 7A which is bent toward the viewer by the Fresnel lens screen 16 to diffuse the rays of light, and is comprised of a lens element 17a and a light diffusing sheet 17b. The reflector 15 is a component for guiding the rays of light to be projected 7A from the projector 13 to the transparent screen 14.

Next, the operation of the three-dimensional image display device will be explained. The rays of light to be projected 7A from the projector 13 are reflected toward the transparent screen 14 by the reflector 15. In the transparent screen 14, the rays of light to be projected 7A are bent toward the viewer by the Fresnel lens screen 16, and the image light rays 7 which diverge as a result of the angle of divergence being provided by the light diffusing part 17 propagate in the direction of the viewer, so that the image light rays are observed by the viewer's left eye A and right eye B via the transmitted light selecting device 2.

Hereafter, a case in which the projector 13 outputs the rays of light to be projected having polarization directions perpendicular to each other, and the image light rays 7a and 7b having polarization directions perpendicular to each other from the transparent screen 14 are displayed alternately in a time series in the same way as that shown in above-mentioned Embodiment 3 will be mentioned as an example. In this case, the image display device 3C notifies time series information showing the timing with which each of the image light rays 7a and 7b is displayed to the transmitted light selecting device 2C via the communication units 10a.

The transmitted light selecting device 2C controls the rotation of the polarized light transmission axis of the shutter 12a of the first light selecting unit 2g and that of the shutter 12b of the second light selecting unit 2h in synchronization with the display timing shown by the above-mentioned time series information to selectively allow one of the image light rays for the viewer's left eye A and right eye B to pass therethrough alternately toward the viewer's left eye A and right eye B. As a result, the viewer is enabled to view the image displayed on the transparent screen 14 corresponding to the screen 6 in three dimensions. The polarization states of the image light rays 7 are mixed spatially while the image light rays propagate from the pupil of the viewer's left or right eye A or B to the retina, and the degree of coherence of each of the left-eye image light ray and the right-eye image light ray is reduced. Therefore, an image display in which the image degradation due to speckle noise or the like is reduced can be implemented.

Figure 11:
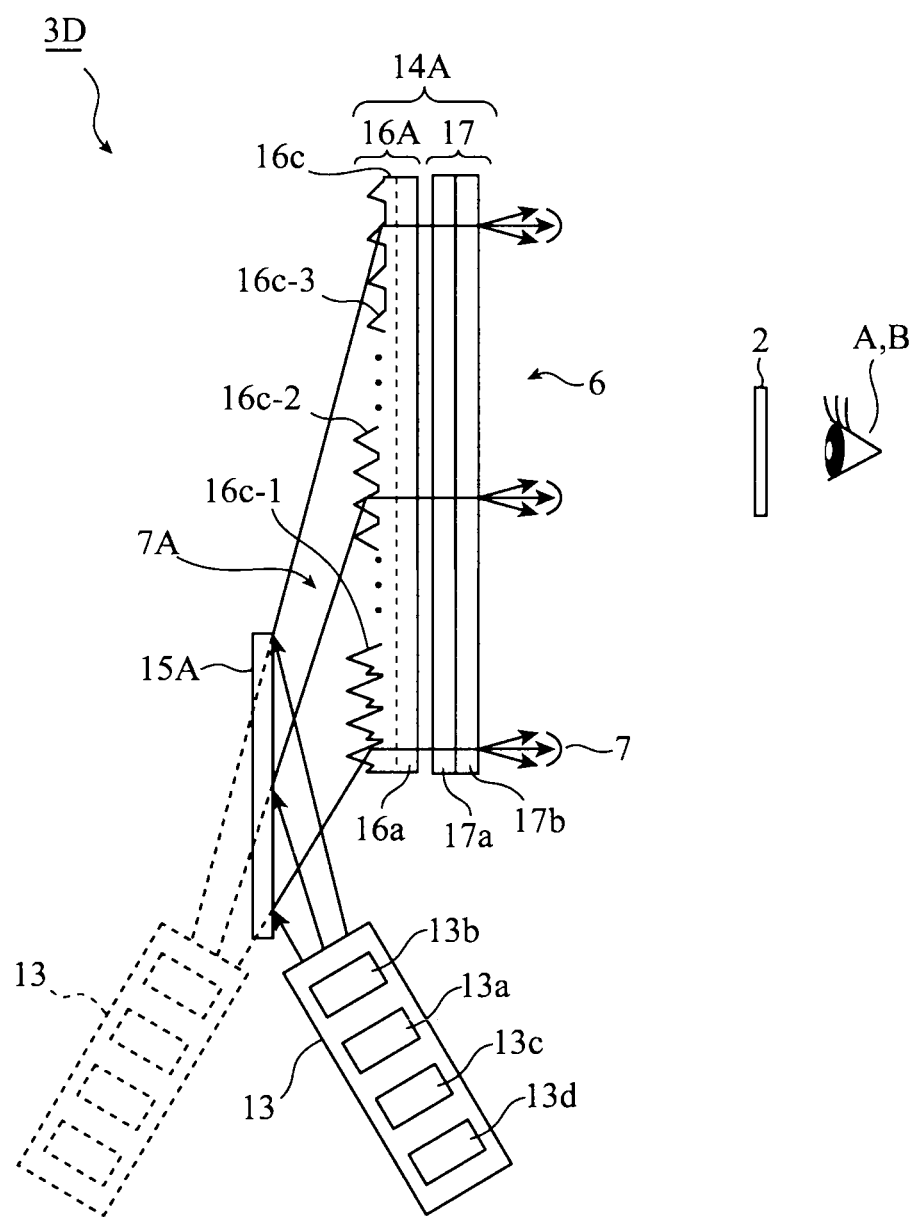
FIG. 11 is a view showing another example of the structure of the image display device in accordance with Embodiment 5.

Focusing attention to the Fresnel lens screen 16 of the transparent screen 14 which is used in combination with the projector 13, an image display device having a structure as shown below can be used as the image display device. FIG. 11 is a view showing another example of the structure of the image display device in accordance with Embodiment 5, and the same components as those shown in FIG. 10 are designated by the same reference numerals and the explanation of the components will be omitted hereafter. In FIG. 11, the image display device 3D is provided with a projector 13, a transparent screen 14A, and a reflector 15A. The transparent screen 14A is the one onto which the rays of light to be projected 7A from the projector 13 are projected, and is provided with a Fresnel lens screen 16A and a light diffusing part 17. The Fresnel lens screen 16A and the light diffusing part 17 can be formed to be bonded to each other with an adhesive or the like.

The Fresnel lens screen 16A is a Fresnel optical element for bending the rays of light to be projected 7A from the projector 13 toward the viewer, and is comprised of a Fresnel lens board 16a and a light entering surface side Fresnel lens 16c. The light diffusing part 17 is a component for providing an angle of divergence to the rays of light to be projected 7A which is bent toward the viewer by the Fresnel lens screen 16A to diffuse the rays of light, and is comprised of a lens element 17a and a light diffusing sheet 17b. The reflector 15 is a component for guiding the rays of light to be projected 7A from the projector 13 to the transparent screen 14A.

As the light entering surface side Fresnel lens 16c, a lens in which light entering surface side total reflection/refraction mixed type Fresnel lenses 16c-1, light entering surface side total reflection type Fresnel lenses 16c-2, and light entering surface side portion total reflection type Fresnel lenses 16c-3 are formed mixedly in a lens side surface is used according to the design of the optical system, as shown in FIG. 11. In this case, each light entering surface side total reflection/refraction mixed type Fresnel lens 16c-1 is a Fresnel lens in which a light entering surface side total reflection type Fresnel lens 16c-2 and a refraction type Fresnel lens for deflecting only a refracted part of a light ray incident thereupon toward the direction of the light exiting surface are formed mixedly in one prism. Each light entering surface side total reflection type Fresnel lens 16c-2 is an Fresnel lens for totally reflecting a light ray incident thereupon toward the direction of the light exiting surface with its opposite faces. Each light entering surface side portion total reflection type Fresnel lens 16c-3 is a light entering surface side portion total reflection type Fresnel lens which is formed by shaping a light entering surface side total reflection type Fresnel lens 16c-2 in such a way that its valley part extends in parallel with the light exiting surface.

What is necessary is just to properly select one or more of these types of Fresnel lenses 16c-1 to 16c-3 according to the design of the projector device which is the image display device 3D, and it is needless to say that it is not necessary to mixedly provide all the three types in the lens side of the Fresnel lens screen 16A. Furthermore, for reasons associated with machining of the lens shape, a part of the tip of each prism can be cut in such a way as to be approximately parallel to a light ray incident thereupon. Because the Fresnel lens screen 16A for use in the transparent screen 14A is chosen according to the characteristics of the projector 13, and the light diffusing part 17 for use in the transparent screen 14A is chosen according to optical properties including an angle of visibility and the brightness of the screen, they are designed and manufactured separately and are chose independently in many cases. Therefore, the Fresnel lens screen 16A and the light diffusing part 17 in the transparent screen 14A can be separated from each other in terms of optical characteristics.

The use of the light entering surface side Fresnel lens 16c as the Fresnel lens screen 16A of the transparent screen 14A in the projector device equipped with the transparent screen 14A, the reflector 15A, and the projector 13, which are mentioned above, can place the projector 13 at a position which is closer to the screen and where the projector performs a slanted projection of the image light rays, as shown in FIG. 11. As a result, as compared with the structure of FIG. 10, for example, the distance from the projector 13 to the transparent screen 14A, i.e., the depth can be reduced, and the image display device can be reduced in thickness.

As mentioned above, because the image display device in accordance with this Embodiment 5 can project the rays of light to be projected 7A from the projector 13 onto the transparent screen 14A, the rays of light to be projected 7A are bent toward the viewer and are diverged with an angle of divergence, and the viewer is enabled to view the image with good quality. Furthermore, because the communication units 10a can communicate the time series information of the image light rays 7 to the communication unit 10b of the transmitted light selecting device 2, the transmitted light selecting device 2 is enabled to select an image light ray. As a result, the viewer can view the image displayed on the screen of the image display device 3C or 3D in three dimensions.

Embodiment 6

Figure 12:
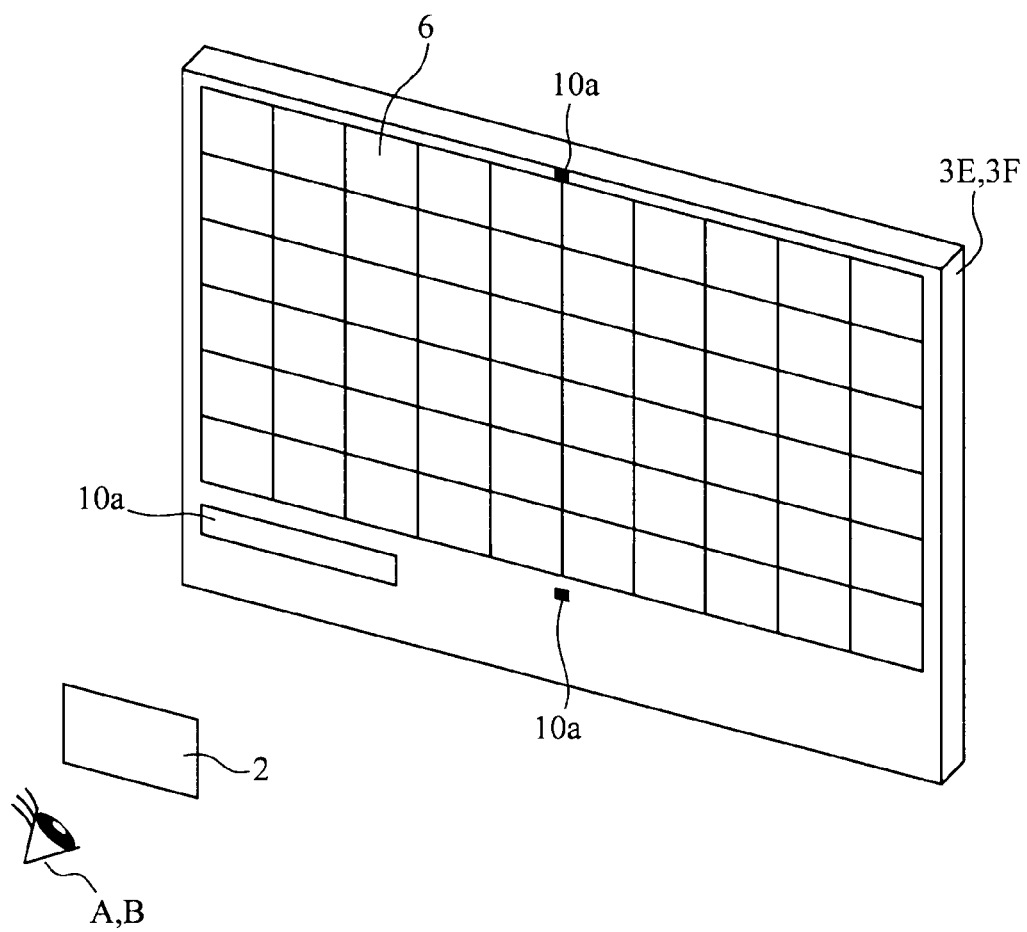
FIG. 12 is a view schematically showing the structure of a three-dimensional image display device in accordance with Embodiment 6 of the present invention.

FIG. 12 is a view schematically showing the structure of a three-dimensional image display device in accordance with Embodiment 6 of the present invention. The three-dimensional image display device shown in FIG. 12 enables a viewer to view an image on a screen 6 of an image display device 3E or 3F, which will be mentioned below, via a transmitted light selecting device 2 to make the viewer view the image displayed in three dimensions. In this embodiment, the transmitted light selecting devices 2 is one of the transmitted light selecting devices 2 to 2D shown in above-mentioned Embodiments 1 to 4, and selectively allows image light rays displayed on the screen 6 of the image display device 3E or 3F to pass therethrough toward a viewer's left eye A and right eye B. Furthermore, the image display device 3E or 3F is provided with communication units 10a each for communicating with a communication unit 10b (not shown) which is disposed in the transmitted light selecting device 2, like those in accordance with above-mentioned Embodiments 3 and 4. In a case of alternately displaying a left-eye image and a right-eye image in a time series, the image display device 3E or 3F can select one image light ray in the same way that those in accordance with above-mentioned Embodiments 3 and 4 do by notifying time series information showing the timing with which the image display device 3E or 3F displays the left-eye image or the right-eye image to the transmitted light selecting device 2 via the communication units 10a.

Although in the example of FIG. 12, a case in which the communication units 10a are arranged in a front portion of the device on a lower left side of the screen 6, in an upper portion of the device on a center line dividing the screen 6 into right and left parts, and in a lower portion of the device on the center line is shown, they can be arranged at arbitrary positions as long as they are arranged at positions where they can easily communicate with the communication unit 10b of the transmitted light selecting device 2. For example, in a case in which the transmitted light selecting device 2 is formed in the form of glasses, although it is preferable that one communication unit 10a is arranged in a part of the device on the center line of the screen 6 because the transmitted light selecting device 2 is placed at the same height as that of the viewer's line of sight when the viewer wears the transmitted light selecting device, one communication unit 10a can be arranged in a rear portion of the screen 6.

Figure 13:
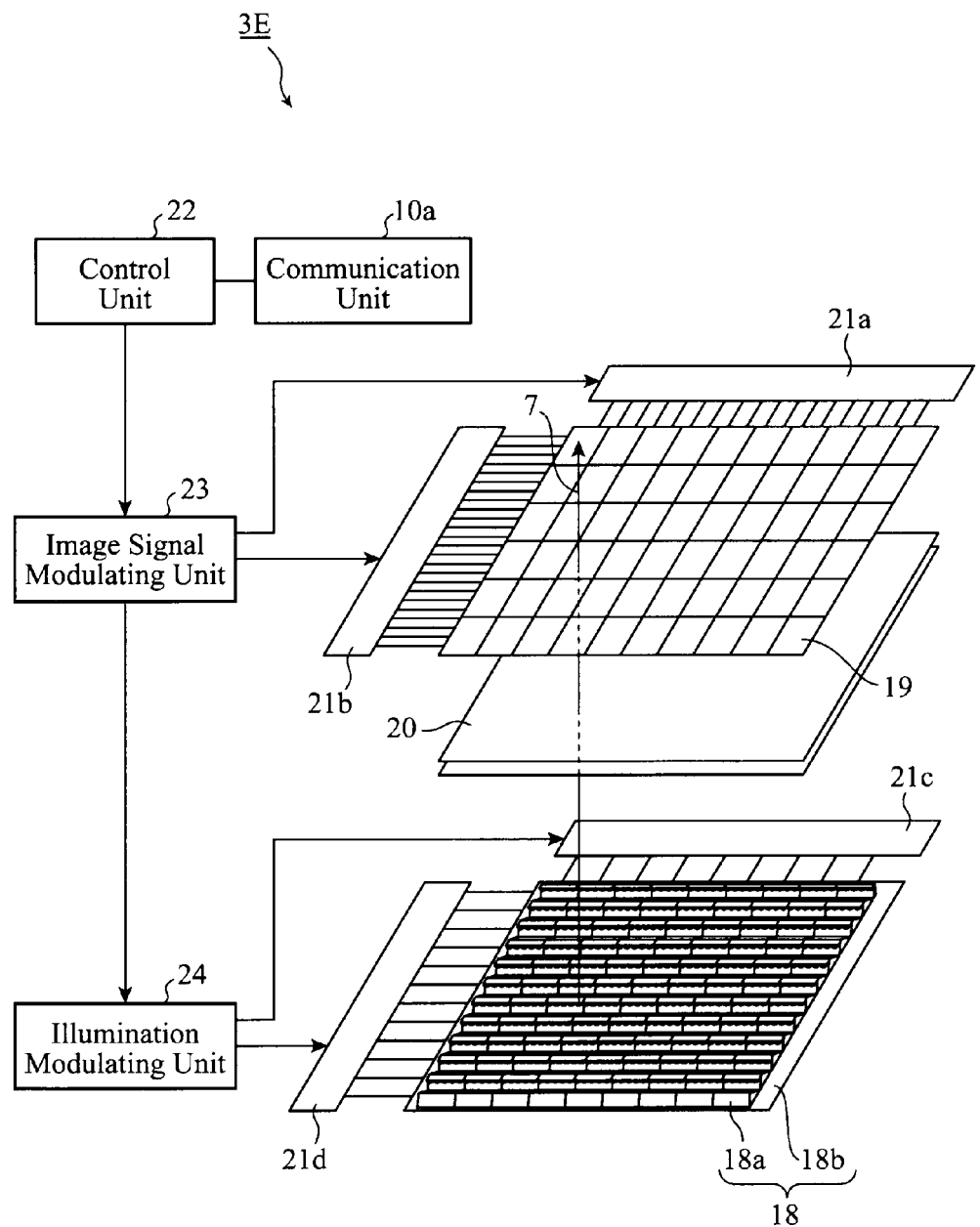
FIG. 13 is a view showing the structure of an image display device in accordance with Embodiment 6.

FIG. 13 is a view showing the structure of the image display device in accordance with Embodiment 6. As shown in FIG. 13, the image display device 3E is provided with the communication units 10a, a backlight 18, optical modulators 19, a light diffusing part 20, driving circuits 21a to 21d, a control unit 22, an image signal modulating unit 23, and an illumination modulating unit 24. The backlight 18 is comprised of illumination parts 18a which are a light source, and an optical system including a lens, and creates light which is a source of image light rays 7 and provides the light to a display screen in which optical modulators 19 are arranged. The plurality of illumination parts 18a arranged on a surface of a housing 18b for shielding the illumination parts from ambient light are driven by control signals from the driving circuits 21c and 21d so that the brightness of the backlight 18 is adjusted.

Figure 14:
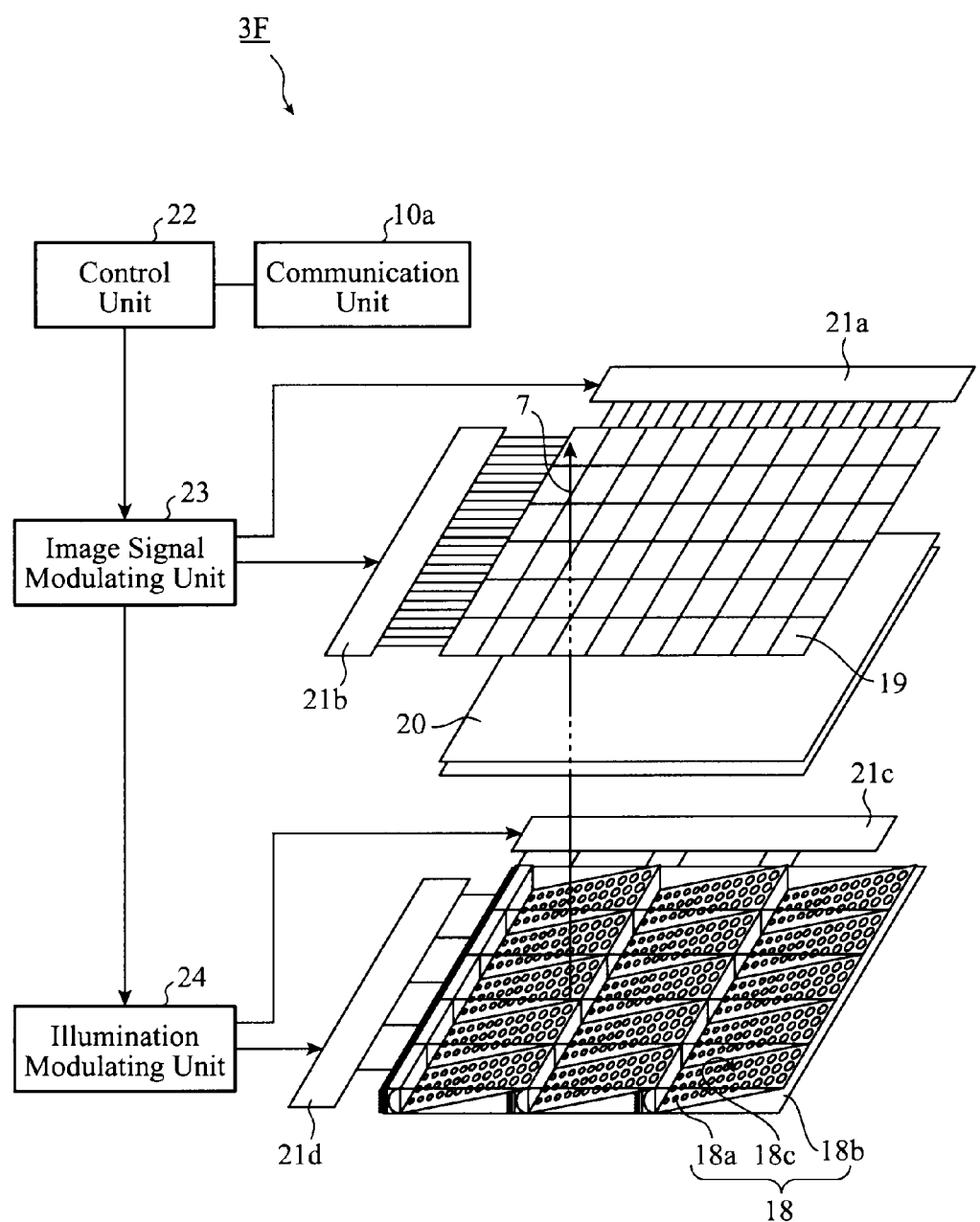
FIG. 14 is a view showing another example of the structure of the image display device in accordance with Embodiment 6.

The plurality of optical modulators 19 are driven by control signals from the driving circuits 21a and 21b so that the polarizations of the light rays are controlled, and the image light rays 7 are created. The screen in which the optical modulators 19 are arranged corresponds to the screen 6 shown in FIG. 12. The light diffusing part 20 is a component for uniformly diffusing the light applied from the backlight 18 to the display screen. The backlight 18 can be constructed in such a way as to include light guide parts 18c each for guiding light rays from illumination parts 18a to optical modulators 19, as shown in the image display device 3F shown in FIG. 14.

The control unit 22 is a component for controlling the operation of the image signal modulating unit 23 and that of the illumination modulating unit 24, and the image signal modulating unit 23 is a component for controlling the driving of the optical modulators 19 by the driving circuits 21a and 21b to create the image light rays having polarization directions perpendicular to each other. The illumination modulating unit 24 is a component for controlling the driving of the illumination parts 18a by the driving circuits 21c and 21d to adjust the brightness of the backlight 18. For example, the control unit 22 controls switching between the polarization directions of the image light rays 7 which is performed by the optical modulators 19 whose drives are controlled by the image signal modulating unit 23 while controlling the illumination modulating unit 24 to adjust the brightness of the backlight 18.

Next, the operation of the image display device will be explained. The light rays from the illumination parts 18a are applied to the display screen in which the optical modulators 19 are arranged after they are diffused via the light diffusing part 20. The optical modulators 19 are driven by the driving circuits 21a and 21b controlled by the image signal modulating unit 23 to spatially modulate the light rays from the illumination parts 18a in such a way that the light rays become an image to create image light rays 7. These image light rays 7 propagate in the direction of the viewer, and are observed by the viewer's left eye A and right eye B via the transmitted light selecting device 2.

Hereafter, a case in which in the image display device 3E, the image light rays 7 having polarization directions perpendicular to each other from the display screen in which the optical modulators 19 are arranged are displayed alternately in a time sequence in the same way as that shown in above-mentioned Embodiment 3 will be mentioned as an example. In this case, the image display device 3E notifies time series information showing the timing with which each of the image light rays 7 is displayed to a transmitted light selecting device 2C via the communication units 10a.

The transmitted light selecting device 2C controls the rotation of the polarized light transmission axis of a shutter 12a of a first light selecting unit 2g and that of a shutter 12b of a second light selecting unit 2h in synchronization with the display timing shown by the above-mentioned time series information to selectively allow one of the image light rays for the viewer's left eye A and right eye B to pass therethrough alternately toward the viewer's left eye A and right eye B. As a result, the viewer is enabled to view the image displayed on the screen 6 in three dimensions. The polarization states of the image light rays 7 are mixed spatially while the image light rays propagate from the pupil of the viewer's left or right eye A or B to the retina, and the degree of coherence of each of the left-eye image light ray and the right-eye image light ray is reduced. Therefore, an image display in which the image degradation due to speckle noise or the like is reduced can be implemented.

As mentioned above, because the image display device in accordance with this Embodiment 6 can communicate the time series information of the image light rays 7 to the communication unit 10b of the transmitted light selecting device 2, the transmitted light selecting device 2 is enabled to select an image light ray. As a result, the viewer can view the image displayed on the screen of the image display device 3E or 3F in three dimensions.

While the invention has been particularly described with reference to preferred embodiments thereof, it will be understood that within the scope of the appended claims, a free combination of some preferred embodiments, a modification of an arbitrary component in each preferred embodiment, or an omission of an arbitrary component in each preferred embodiment can be made.

What is claimed is:

1. A transmitted light selecting device that selectively allows image light rays of images, which are displayed in polarization directions perpendicular to each other on an image display device, to pass therethrough according to said polarization directions, said transmitted light selecting device comprising:
    a first light selecting unit for selecting a first image light ray having one of said polarization directions incident thereupon from said image display device, and changing a polarization direction of the first image light ray into a plurality of polarization directions to pass toward a viewer; and
    a second light selecting unit for selecting a second image light ray having another of said polarization directions incident thereupon from said image display device, and changing a polarization direction of the second image light ray into a plurality of polarization directions to pass toward said viewer.

2. The transmitted light selecting device according to claim 1, wherein said first light selecting unit has a first polarizing filter for allowing said first image light ray incident upon said first light selecting unit to pass therethrough, and a first phase difference film for providing a plurality of different first phase differences to the light ray passing through said first polarizing filter and changing the polarization direction of the first image light ray into the plurality of polarization directions to pass toward the viewer, wherein said second light selecting unit has a second polarizing filter having a polarized light transmission axis whose direction is perpendicular to that of said first polarizing filter, for allowing said second image light ray incident upon said second light selecting unit to pass therethrough, and a second phase difference film for providing a plurality of different second phase differences to the light ray passing through said second polarizing filter and changing the polarization direction of the second image light ray into the plurality of polarization directions to pass toward said viewer, and wherein, for each of the first and second light selecting units, said first and second polarizing filters are arranged closer to said image display device than said first and second phase difference films.

3. The transmitted light selecting device according to claim 2, wherein each of said first phase difference film and second phase difference film has at least two regions in which the directions of their polarized light transmission axes differ.

4. A three-dimensional image display device, comprising:
    an image display device for emitting image light rays whose polarization directions are perpendicular to each other; and
    a transmitted light selecting device including:
        a first light selecting unit for selecting a first image light ray having one of said polarization directions incident thereupon from said image display device, and changing a polarization direction of the first image light ray into a plurality of polarization directions to pass toward a viewer, and
        a second light selecting unit for selecting a second image light ray having another of said polarization directions incident thereupon from said image display device, and changing a polarization direction of the second image light ray into a plurality of polarization directions to pass toward said viewer.

5. The three-dimensional image display device according to claim 4, wherein said first light selecting unit has a first polarizing filter for allowing said first image light ray incident upon said first light selecting unit to pass therethrough, and a first phase difference film for providing a plurality of different first phase differences to the light ray passing through said first polarizing and changing the polarization direction of the first image light ray into the plurality of polarization directions to pass toward the viewer, wherein said second light selecting unit has a second polarizing filter having a polarized light transmission axis whose direction is perpendicular to that of said first polarizing filter, for allowing said second image light ray incident upon said second light selecting unit to pass therethrough, and a second phase difference film for providing a plurality of different second phase differences to the light ray passing through said second polarizing filter and changing the polarization direction of the second image light ray into the plurality of polarization directions to pass toward said viewer, and wherein, for each of the first and second light selecting units, said first and second polarizing filters are arranged closer to said image display device than said first and second phase difference films.

6. A three-dimensional image display method of selectively allowing image light rays of images, which are displayed in polarization directions perpendicular to each other on an image display device, to pass through according to said polarization directions, by using a transmitted light selecting device to display said images in three dimensions for a viewer, comprising:

when allowing at least one first image light ray, emitted from said image display device and having one of the polarization directions, to pass through as a right-eye image for said viewer, in said transmitted light selecting device:

providing a plurality of it phase differences to the at least one first image light ray of the right-eye image; and changing the polarization direction of the first image light ray into the plurality of polarization directions; and when allowing at least one second image light ray, emitted from said image display device and having another one of the polarization directions, to pass through as a left-eye image for said viewer, in said transmitted light selecting device:

providing a plurality of second phase differences to the at least one second image light ray of the left-eye image for said viewer; and changing the polarization direction of the second image light ray into the plurality of polarization directions.

* * * * *